(12) United States Patent
Tohara et al.

(10) Patent No.: US 11,977,222 B2
(45) Date of Patent: May 7, 2024

(54) IMAGE DISPLAY APPARATUS

(71) Applicant: CANON KABUSHIKI KAISHA, Tokyo (JP)

(72) Inventors: Masakazu Tohara, Tokyo (JP); Norifumi Kajimoto, Kanagawa (JP); Ryoji Kondo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/986,055

(22) Filed: Nov. 14, 2022

(65) Prior Publication Data

US 2023/0152577 A1 May 18, 2023

(30) Foreign Application Priority Data

Nov. 18, 2021 (JP) .................................. 2021-187505
Feb. 25, 2022 (JP) .................................. 2022-028542

(51) Int. Cl.
*G02B 27/00* (2006.01)
*G02B 5/30* (2006.01)
(Continued)

(52) U.S. Cl.
CPC ....... *G02B 27/0025* (2013.01); *G02B 25/001* (2013.01); *G02B 27/283* (2013.01); *G06F 1/163* (2013.01); *G02B 5/3083* (2013.01)

(58) Field of Classification Search
CPC .............. G02B 27/0025; G02B 25/001; G02B 27/283; G02B 5/3083; G02B 27/01;
(Continued)

(56) References Cited

U.S. PATENT DOCUMENTS 5,889,625 A 3/1999 Chen et al.
2015/0379697 A1 12/2015 Pohl
(Continued)

FOREIGN PATENT DOCUMENTS

JP 2021071602 A 5/2021

OTHER PUBLICATIONS

Extended European Search Report issued in European Appln. No. 22206856.1 dated Mar. 29, 2023.
(Continued)

*Primary Examiner* — Collin X Beatty
(74) *Attorney, Agent, or Firm* — ROSSI, KIMMS & McDOWELL LLP

(57) ABSTRACT

An image display apparatus includes an image display element, and an eyepiece optical system configured to guide light from the image display element to an exit pupil. The eyepiece optical system includes at least one correction element having different characteristics between a central area and a peripheral area different from the central area. When first light is light emitted from a central portion of the image display element, and second light is light emitted from an outermost peripheral portion of the image display element, the characteristics of the at least one correction element are set such that color drift of the second light after pass through the peripheral area from the first light after pass through the central area is less than color drift of the second light before pass through the peripheral area from the first light before pass through the central area.

20 Claims, 20 Drawing Sheets

(51) Int. Cl.
  *G02B 25/00* (2006.01)
  *G02B 27/28* (2006.01)
  *G06F 1/16* (2006.01)

(58) Field of Classification Search
  CPC ...... G02B 27/011; G02B 27/10; G02B 27/28;
    G02B 27/281; G02B 27/286; G02B
    27/288; G02B 27/4261; G02B 27/005;
    G02B 27/0068; G02B 25/00; G02B
    25/002; G02B 25/004; G02B 25/005;
    G02B 25/007; G02B 25/008; G02B
    25/02; G02B 25/04; G02B 27/0172;
    G02B 3/00; G02B 27/14; G06F 1/163
  USPC ............ 359/483.01, 485.01, 489.01, 489.14;
    348/483.01, 485.01, 489.01, 489.14
  See application file for complete search history.

(56) References Cited

U.S. PATENT DOCUMENTS

| | | | |
|---|---|---|---|
| 2018/0157053 A1* | 6/2018 | Richards | G02B 6/0068 |
| 2018/0239146 A1 | 8/2018 | Bierhuizen et al. | |
| 2019/0079234 A1 | 3/2019 | Takagi et al. | |
| 2019/0086675 A1* | 3/2019 | Carollo | G02B 27/288 |
| 2021/0132388 A1 | 5/2021 | Yamaguchi et al. | |
| 2021/0165227 A1 | 6/2021 | Yamaguchi et al. | |
| 2021/0239985 A1 | 8/2021 | Tohara | |
| 2023/0289929 A1* | 9/2023 | Inada | G09G 5/00 |

OTHER PUBLICATIONS

Pohl et al. "Improved Pre-Warping for Wide Angle, Head Mounted Displays" XP055237173. 2013: pp. 1-4. Cited in NPL 1.

* cited by examiner

101

IMAGE DISPLAY APPARATUS

BACKGROUND

Technical Field

The disclosure relates to an image display apparatus suitable for a head mount display or the like for magnifying and observing an image on an image display element via an eyepiece optical system.

Description of the Related Art

In order to realize a thin and lightweight image display apparatus with a wide view angle, Japanese Patent Laid-Open No. ("JP") 2021-71602 discloses a configuration that folds an optical path using polarization.

However, in the configuration disclosed in JP 2021-71602, an emission angle of light emitted from a peripheral portion of an image display element is so large that color drift (or displacement) occurs in the peripheral portion of the image display element from a central portion of the image display element, and the peripheral portion of the image cannot be observed in correct color.

SUMMARY

The disclosure provides an image display apparatus that is advantageous in reducing color drift of a peripheral portion of an image display element from a central portion of the image display element.

An image display apparatus according to one aspect of the disclosure includes an image display element, and an eyepiece optical system configured to guide light from the image display element to an exit pupil. The eyepiece optical system includes at least one correction element having different characteristics between a central area and a peripheral area different from the central area. When first light is light emitted from a central portion of the image display element, and second light is light emitted from an outermost peripheral portion of the image display element, the characteristics of the at least one correction element are set such that color drift of the second light after pass through the peripheral area from the first light after pass through the central area is less than color drift of the second light before pass through the peripheral area from the first light before pass through the central area.

An image display apparatus according to another aspect of the disclosure includes an image display element, and an eyepiece optical system configured to guide light from the image display element to an exit pupil. A white balance is different between a central portion of the image display element and an area different from the central portion of the image display element in the eyepiece optical system such that after first light emitted from the central portion of the image display element and second light emitted from an outermost peripheral portion of the image display element pass through the eyepiece optical system, color drift of the second light from the first light is less than color drift of the second light from the first light before the first light and the second light pass through the eyepiece optical system.

Further features of the disclosure will become apparent from the following description of exemplary embodiments with reference to the attached drawings.

DESCRIPTION OF THE EMBODIMENTS

Figure 1:
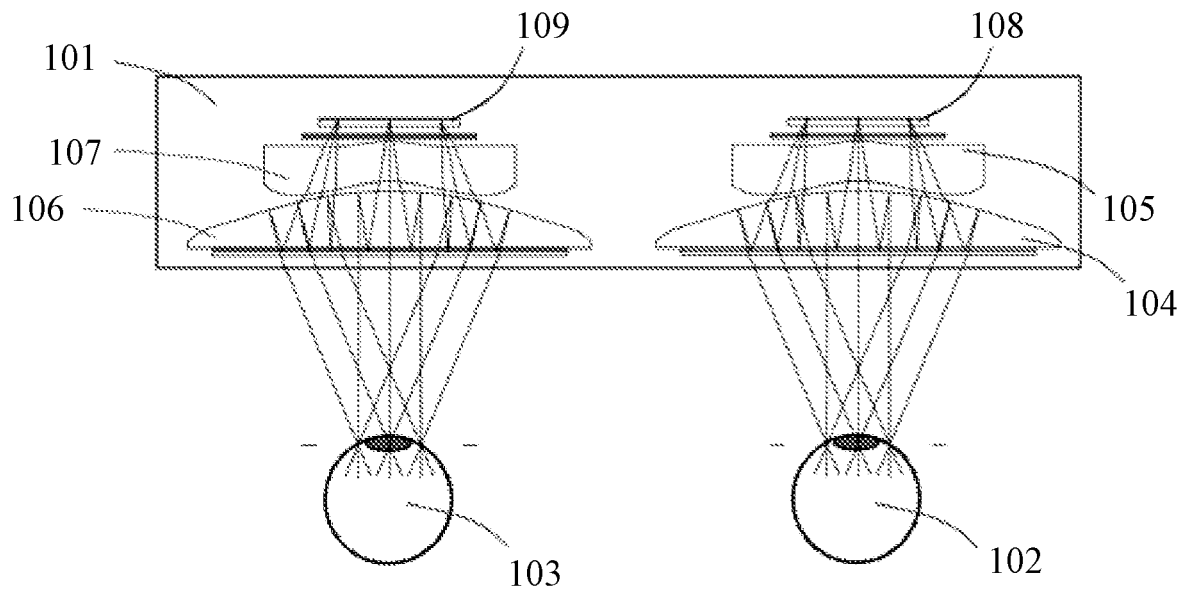
FIG. 1 explains a head mount display as an example of an image display apparatus according to a first embodiment.

Referring now to the accompanying drawings, a detailed description will be given of embodiments according to the disclosure. Corresponding elements in respective figures will be designated by the same reference numerals, and a duplicate description thereof will be omitted.

First Embodiment

FIG. 1 explains a head mount display (HMD hereinafter) 101 as an example of an image display apparatus according to this embodiment. The HMD 101 includes lenses 104, 105, 106, and 107, a right-eye image display element 108, and a left-eye image display element 109. The lenses 104 and 105 constitute a right-eye eyepiece optical system, and the lenses 106 and 107 constitute a left-eye eyepiece optical system. Each of the right-eye image display element 108 and the left-eye image display element 109 is an organic Electro Luminescence ("EL") display.

The right-eye eyepiece optical system magnifies and projects the original image displayed on the right-eye image display element 108 as a virtual image and guides it to a right eye 102 of an observer. The left-eye eyepiece optical system magnifies and projects the original image displayed on the left-eye image display element 109 as a virtual image and guides it to a left eye 103 of the observer. Each of the right-eye eyepiece optical system and the left-eye eyepiece optical system has a focal length of 12 mm, a horizontal display view angle of 45°, a vertical display view angle of 34°, and a diagonal display view angle of 54°. A distance (eye relief) between the HMD 101 and each eyeball of the observer is 18 mm.

Figure 2:
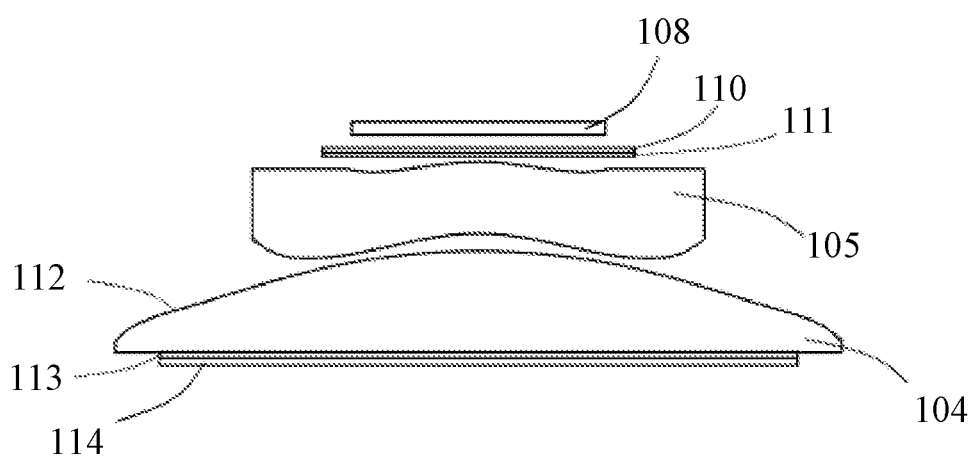
FIG. 2 explains a right-eye eyepiece optical system according to the first embodiment.

The eyepiece optical system according to this embodiment has a configuration that folds an optical path using polarization. The optical path of the eyepiece optical system will be described with reference to the right-eye eyepiece optical system. FIG. 2 explains the right-eye eyepiece optical system according to this embodiment. The right-eye eyepiece optical system includes, in order from the side of the right-eye image display element 108, a polarizing plate (first polarizing plate) 110, a phase plate (first phase plate) 111, the lenses 105 and 104, a phase plate (second phase plate) 113, and a polarizing beam splitter (referred to as PBS hereinafter) 114. A half-mirror 112 is deposited on the surface of the lens 104 on the side of the lens 105. The surface on which the half-mirror 112 is vapor-deposited acts as a half-transmissive reflective surface (half-transmissive reflective film). Each of the phase plate 113 and PBS 114 has a planar shape. Each of the phase plates 111 and 113 is a quarter waveplate having a phase difference of λ/4.

In this embodiment, a slow axis of the phase plate 111 is tilted by 45° to a polarization direction transmitting through the polarizing plate 110, a slow axis of the phase plate 113 is tilted by −45° to the polarization direction transmitting through the polarizing plate 110, and the polarization direction transmitting through the polarizing plate 110 and the polarization direction transmitting through the PBS 114 are orthogonal to each other. In such a configuration, the light emitted from the right-eye image display element 108 passes through the polarizing plate 110, becomes linearly polarized light, passes through the phase plate 111, and becomes circularly polarized light. Thereafter, the polarized light passes through the half-mirror 112, passes through the phase plate 113, and becomes linearly polarized light. Since the polarization direction of the linearly polarized light is orthogonal to the polarization direction transmitting through the PBS 114, the linearly polarized light is reflected by the PBS 114, passes through the phase plate 113, and becomes circularly polarized light. Thereafter, this light is reflected by the half-mirror 112, then transmits through the phase plate 113, and becomes linearly polarized light. Since the polarization direction of the linearly polarized light coincides with the polarization direction transmitting through the PBS 114, the linearly polarized light is guided to the right eye 102 of the observer through the PBS 114. A similar optical path is formed in the left-eye eyepiece optical system.

The thus-configured eyepiece optical system that folds the optical path using polarization as in this embodiment can make the HMD 101 thinner, reduce the focal length of the eyepiece optical system, and thus enable an image to be observed at a wide view angle.

Figure 3:
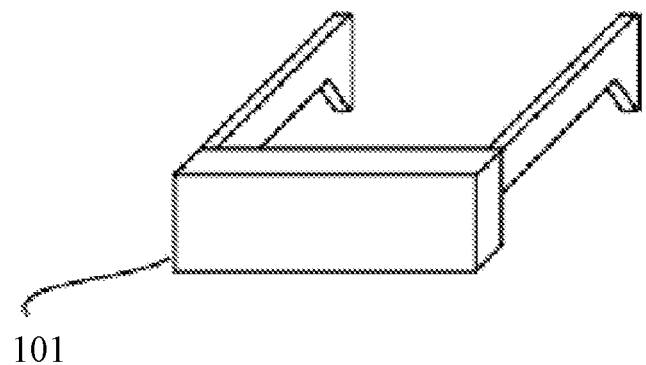
FIG. 3 is an external view of the head mount display according to the first embodiment.

FIG. 3 is an external view of the HMD 101. The HMD 101 is a head mount type image display apparatus and thus lightweight is demanded. Therefore, each lens in the eyepiece optical system may be made of a resin having a specific density smaller than that of glass. This embodiment improves the aberration correcting effect using the lenses 104 and 106 each made of a resin and configured as a plano-convex aspherical lens. Each of the lenses 105 and 107 is made of a resin and configured as a double-sided aspherical lens.

Figure 4:
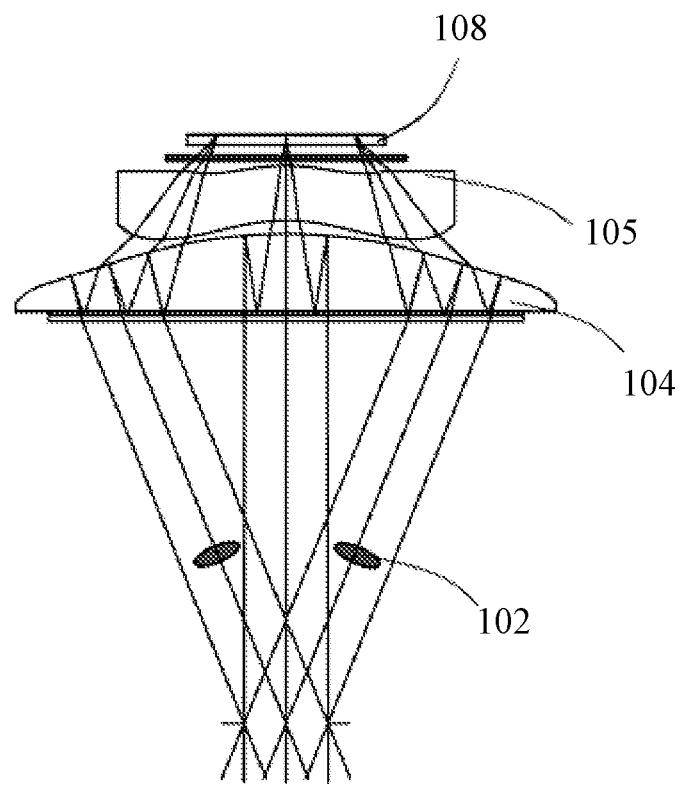
FIG. 4 explains the right-eye eyepiece optical system according to the first embodiment.

FIG. 4 explains the right-eye eyepiece optical system according to this embodiment. In the right-eye eyepiece optical system according to this embodiment, the position of the exit pupil is set to a position of 28 mm, which is made by adding the eye relief (=18 mm) and a rotation radius (=10 mm) of the eyeball, and an exit pupil diameter is set to 6 mm. Thereby, even in a case where the eyeball is rotated to observe an image up, down, left, and right, the light in that direction enters the eyeball. The eye relief may be 15 mm or longer so that the observer wearing glasses can wear the HMD 101. As the eye relief becomes longer, the outer diameter of each lens becomes larger and the HMD 101 becomes larger. Therefore, the eye relief may be 25 mm or less.

Figure 5:
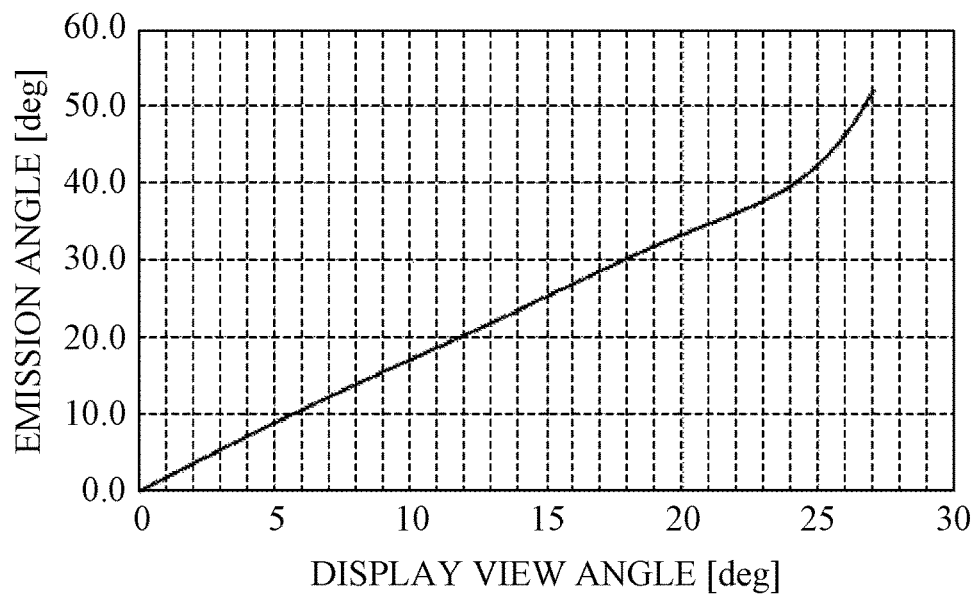
FIG. 5 explains an emission angle of light emitted from an image display element according to the first embodiment.

Since the eyepiece optical system according to this embodiment has a short focal length and is thin, the emission angle of light emitted from the peripheral portion of the image display element to the exit pupil of the eyepiece optical system is large, as understood from FIG. 4. The peripheral portion is an area outside the central portion of the right-eye image display element 108. FIG. 5 explains the emission angle of the light emitted from the image display element according to this embodiment, and illustrates a relationship between the display view angle and the emission angle of the light emitted from the image display element to the exit pupil. The emission angle of the light emitted from the image display element is the emission angle of the principal ray guided to the center of the exit pupil. As illustrated in FIG. 5, as the display view angle increases, the emission angle increases, the emission angle of the light emitted from the horizontal end of the image display element is 37 degrees, and the emission angle of the light emitted from the vertical end is 29 degrees. In order to shorten the focal length of the eyepiece optical system and to make thinner the HMD 101, the emission angle of the light emitted from the peripheral portion of the image display element to the center of the exit pupil may be 30 degrees or larger.

Figure 6:
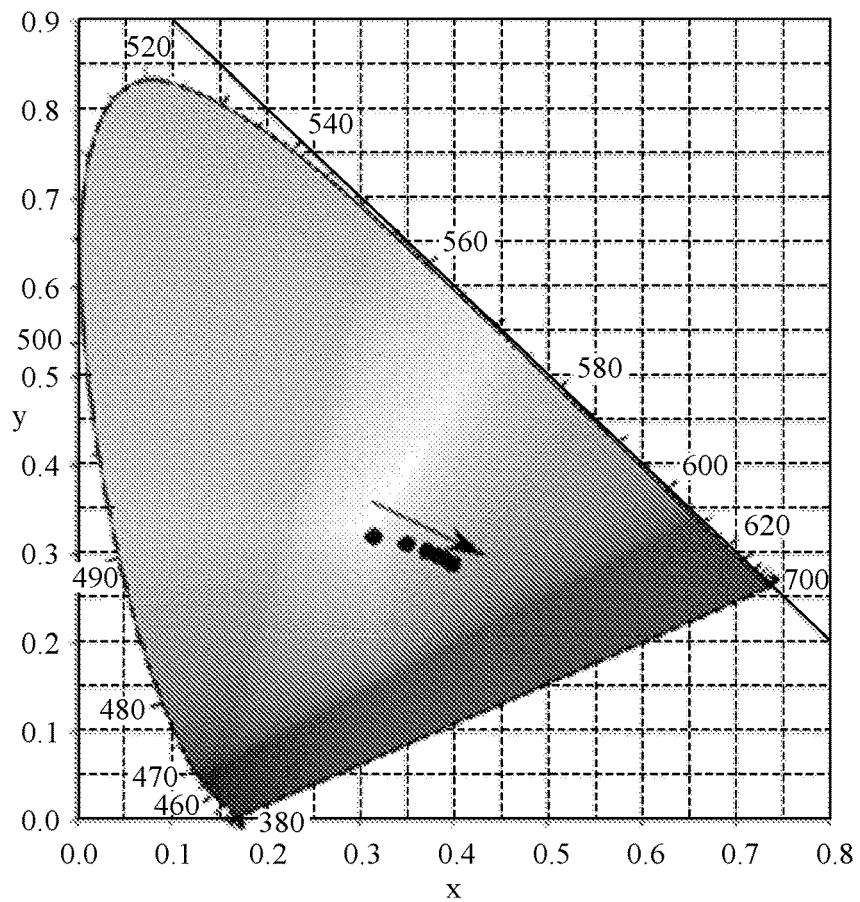
FIG. 6 explains color drift of the image display element in the first embodiment.

As the emission angle of the light emitted from the image display element becomes large, color drift occurs due to the interference of the light emitting layer of the organic EL and the influence of the color mixing of the color filter. In this embodiment, as the emission angle of the light emitted from the image display element increases, the chromaticity changes toward red and color drift occurs, as illustrated in FIG. 6. Therefore, in a case where the observer observes a white image, red is observed in the peripheral portion of the image and thus the image cannot be observed naturally.

Figures 7A, 7B, 7C:
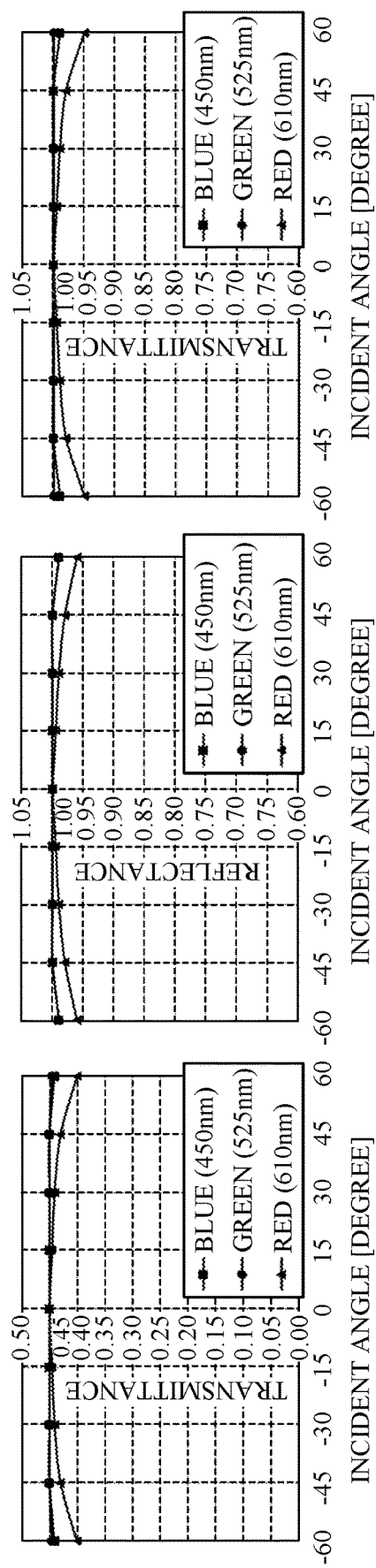
FIGS. 7A to 7C explain characteristics of a polarizing plate and polarizing beam splitter in the first embodiment.

Accordingly, this embodiment makes at least one of the polarizing plate 110 and the PBS 114 function as a correction element having different characteristics between the central portion and an area (peripheral portion) different from the central portion. In a case where the polarizing plate 110 functions as the correction element, the polarizing plate 110 has such a characteristic that the spectral transmittance is different between the central portion and the peripheral portion. In a case where the PBS 114 functions as the correction element, the PBS 114 has such a characteristic that at least one of the spectral transmittance and the spectral reflectance is different between the central portion and the peripheral portion. Thereby, after the first light emitted from the central portion of the right-eye image display element 108 and the second light emitted from the outermost peripheral portion pass through the right-eye eyepiece optical system, color drift of the second light from the first light can be made less than color drift of the second light from the first light before the first light and the second light pass through the right-eye eyepiece optical system. That is, the color drift in the peripheral portion of the right-eye image display element 108 can be canceled. FIGS. 7A to 7C explain the characteristics of the polarizing plate 110 and the PBS 114. FIG. 7A illustrates the transmittance (spectral transmittance) of the polarizing plate 110 to light at an incident angle of 0 degrees for each wavelength. FIG. 7B illustrates the reflectance (spectral reflectance) of PBS 114 to the light at an incident angle of 0 degrees for each wavelength. FIG. 7C illustrates the transmittance (spectral transmittance) of PBS 114 to the light at an incident angle of 0 degrees for each wavelength. The blue dominant wavelength of the image display element is 450 nm, the green dominant wavelength is 525 nm, and the red dominant wavelength is 610 nm. FIGS. 7A to 7C illustrate the transmittance and reflectance at each wavelength. The blue wavelength (first wavelength) may be included in a range from 430 nm to 480 nm. The green wavelength (second wavelength) may be included in a range from 520 nm to 570 nm. The red wavelength (third wavelength) may be included in a range from 600 nm to 650 nm. In a case where the spectral transmittance is made different between the central portion and the peripheral portion, the change may be made unnoticeable and gradual.

As illustrated in FIG. 7A, the transmittances to blue and green lights of the polarizing plate 110 little change even if the incident angle increases, but the transmittance to red light of the polarizing plate 110 decreases as the incident angle increases. The reflectance and transmittance of the PBS 114 show similar tendencies. The light emitted from the peripheral portion of the right-eye image display element 108 has a large emission angle and large incident angles on the polarizing plate 110 and the PBS 114. Thus, as the red color-drifted light emitted from the peripheral portion of the right-eye image display element 108 passes through the polarizing plate 110 and is reflected and transmits through the PBS 114, the intensity of its red color and its color drift can be reduced.

Figure 8:
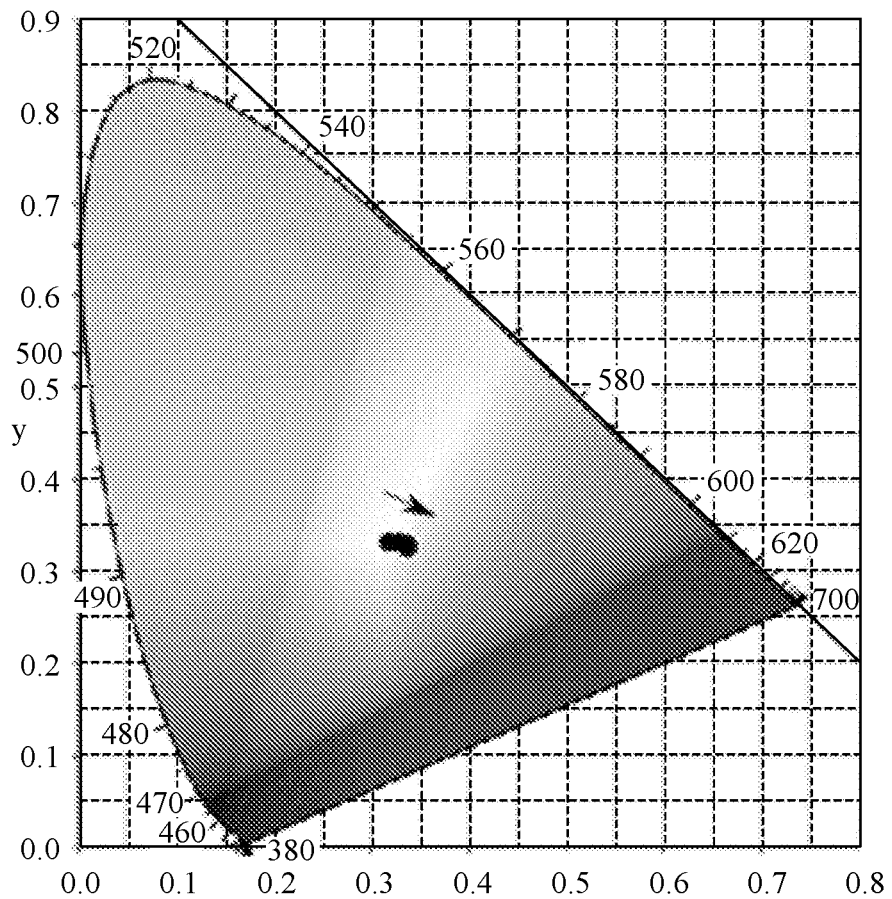
FIG. 8 explains color drift of the eyepiece optical system according to the first embodiment.

FIG. 8 explains the color drift of the eyepiece optical system, and illustrates a relationship between the emission angle and the chromaticity after the light passes through the eyepiece optical system. With the image display element alone, as the emission angle increases, the chromaticity changes toward red as illustrated in FIG. 6, but in a case where the light passes through the eyepiece optical system, the chromaticity change becomes smaller as illustrated in FIG. 8 and the color drift can be reduced. In this embodiment, the chromaticity difference x is 0.1 and the chromaticity difference y is 0.055 on the chromaticity coordinate system (chromaticity diagram) as the emission angle increases in the image display element alone, but the chromaticity difference x can be reduced down to 0.04 and the chromaticity difference y can be reduced down to 0.015 after the light passes through the eyepiece optical system. In order for the observer to hardly notice color drift and naturally observe an image, the chromaticity difference x may be 0.05 or less and the chromaticity difference y may be 0.05 or less on the chromaticity coordinate system.

In this embodiment, a wavelength at which a ratio of the intensity of the light emitted from the peripheral portion of the image display element to the exit pupil to the intensity of the light emitted from the central portion of the image display element to the exit pupil becomes maximum is 610 nm that is the red dominant wavelength, and red color drift occurs as the emission angle increases. Accordingly, color drift of the image display element can be canceled by setting to red, among the red, green, and blue wavelengths, a wavelength at which the transmittance of the polarizing plate 110 and the transmittance and reflectance of the PBS 114 are minimum. Thus, the color drift of the peripheral portion of the right-eye image display element 108 from the central portion of the right-eye image display element 108 is reduced by such characteristics of the polarizing plate 110 and the PBS 114 as the color correction elements that the spectral transmittance is different between each central portion and each peripheral portion of the polarizing plate 110 and the PBS 114, and thereby the observer can observe a more natural image.

The right-eye image display element 108 according to this embodiment has an emission angle of 37 degrees of the light emitted from its horizontal end and half a horizontal display view angle of 22.5 degrees, and an incident angle on the polarizing plate 110 is larger than that on the PBS 114. Thus, the emission angle characteristic of the right-eye image display element 108 may be canceled by the characteristic of the polarizing plate 110 close to that of the right-eye image display element 108.

In the optical path of the right-eye eyepiece optical system, the PBS 114 acts twice by reflection and transmission. Therefore, if the emission angle characteristic of the right-eye image display element 108 is canceled by the characteristic of the PBS 114, the effect of reducing color drift is high. In a case where a color drift direction is different between the horizontal direction and the vertical direction due to the arrangement of the color filters of the right-eye image display element 108, the characteristics of the polarizing plate 110 and the PBS 114 may be changed in the horizontal direction and the vertical direction. In a case where a large emission angle of the light emitted from the right-eye image display element 108 causes red color drift in the horizontal direction and blue color drift in the vertical direction, the characteristic in the horizontal direction of the polarizing plate 110 may be set such that the transmittance of red is low and the characteristic in the vertical direction of the polarizing plate 110 may be set such that the transmittance of blue is low.

This embodiment reduces the chromaticity drift in the case of the large emission angle of the light emitted from the right-eye image display element 108, but may reduce drift of a color difference ΔE*. In that case, the color difference ΔE* may be 15 or less.

In this embodiment, the surface on which the half-mirror 112 of the lens 104 is deposited is a convex surface that is convex toward the right-eye image display element 108. Depositing the half-mirror 112 on the convex surface can realize a wide view angle while thinning the HMD 101. Forming the convex surface on which the half-mirror 112 is vapor-deposited into an aspherical shape can enhance the aberration correcting effect.

In this embodiment, the lenses 105 and 107 are resin lenses, but they may be glass lenses because the outer shape is small and the influence of the weight increase is small. The very little birefringence of the glass lens can provide high-quality image observation.

In order to reduce ghost light of the external light and to increase the contrast of the observed image, a polarizing plate may be disposed between the PBS 114 and each eyeball of the observer.

Since this embodiment compromises a longer eye relief and the thinner HMD 101, the surface on the side of the right eye 102 of the observer on which the phase plate 113 and the PBS 114 of the lens 104 are disposed is set to be planar. In a case where the surface of the lens 104 on the side of the observer is concave toward the observer, the lens 104 becomes thick in order to secure the eye relief in the peripheral portion. In addition, the convex surface makes thicker the lens 104 in order to secure the thickness of the lens edge portion.

In this embodiment, each of the phase plates 111 and 113 is a quarter waveplate having a phase difference of λ/4, but the phase difference may shift from λ/4 so as to cancel the birefringences of the lenses 104 and 105. In this case, a sum of the phase differences of the lens 104 and the phase plate 113 may be 3λ/20 or more and 7λ/20 or less. In addition, a sum of the phase differences of the lens 105 and the phase plate 111 may be 3λ/20 or more and 7λ/20 or less. If each value is out of the above range, the intensity of ghost light will increase and a more natural image cannot be observed.

In this embodiment, the right-eye image display element 108 emits unpolarized light as the organic EL, but may emit linearly polarized light as a liquid crystal display. In this case, the polarizing plate 110 becomes unnecessary, and the HMD 101 can be made thinner and the number of components can be reduced.

In this embodiment, the eyepiece optical system uses the PBS 114 that switches transmission and reflection in the direction of the linearly polarized light, but may use a PBS that switches transmission and reflection in the direction of the circularly polarized light. In this case, the phase plate 113 becomes unnecessary, and the HMD 101 can be made thinner and the number of components can be reduced.

Second Embodiment

Figure 9:
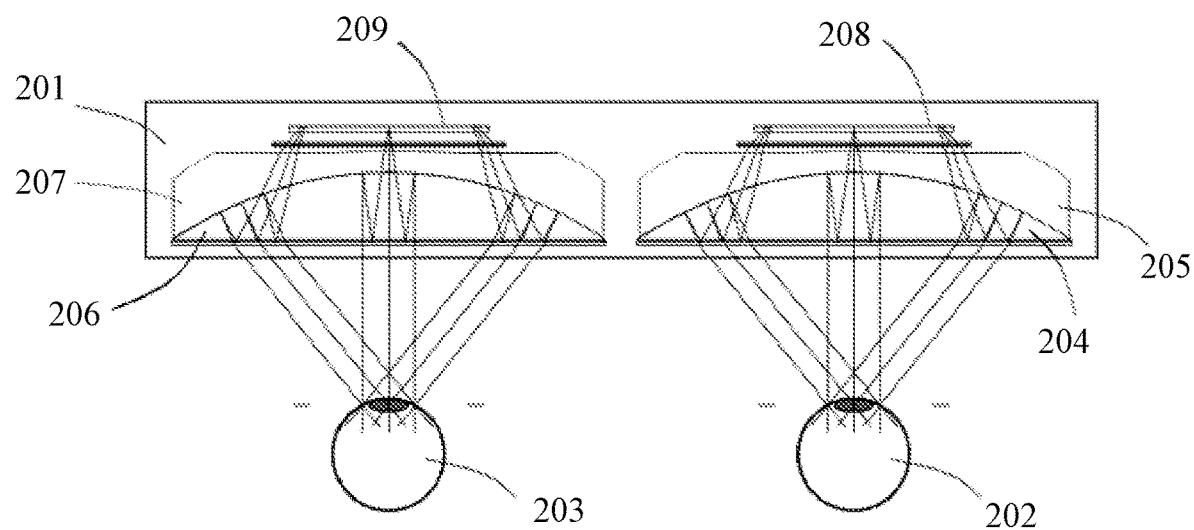
FIG. 9 explains a head mount display as an example of an image display apparatus according to a second embodiment.

FIG. 9 explains a head mount display (HMD hereinafter) 201 as an example of the image display apparatus according to this embodiment. The HMD 201 includes lenses 204, 205, 206, and 207, a right-eye image display element 208, and a left-eye image display element 209. The lenses 204 and 205 constitute a right-eye eyepiece optical system, and the lenses 206 and 207 constitute a left-eye eyepiece optical system. The lenses 204 and 205 and the lenses 206 and 207 are cemented lenses and can be easily held. Each of the right-eye image display element 208 and the left-eye image display element 209 is an organic EL display.

The right-eye eyepiece optical system magnifies and projects the original image displayed on the right-eye image display element 208 as a virtual image and guides it to a right eye 202 of the observer. The left-eye eyepiece optical system magnifies and projects the original image displayed on the left-eye image display element 209 as a virtual image and guides it to a left eye 203 of the observer. Each of the right-eye eyepiece optical system and the left-eye eyepiece optical system has a focal length of 13 mm, a horizontal display view angle of 60°, a vertical display view angle of 60°, and a diagonal display view angle of 78°. A distance (eye relief) between the HMD 201 and each eyeball of the observer is 20 mm.

Figure 10:
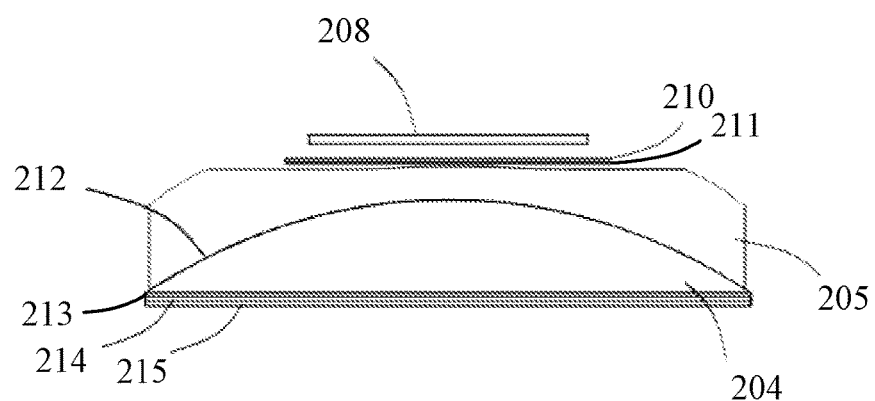
FIG. 10 explains a right-eye eyepiece optical system according to the second embodiment.

The eyepiece optical system according to this embodiment has a configuration that folds an optical path using polarization. The optical path of the eyepiece optical system will be described with reference to the right-eye eyepiece optical system. FIG. 10 explains the right-eye eyepiece optical system according to this embodiment. The right-eye eyepiece optical system includes, in order from the side of the right-eye image display element 208, a polarizing plate (first polarizing plate) 210, a phase plate (first phase plate) 211, the lenses 205 and 204, and a phase plate (second phase plate) 213, a polarizing beam splitter (referred to as PBS hereinafter) 214, and a polarizing plate (second polarizing plate) 215. A half-mirror 212 is deposited on the surface on the side of the lens 205 of the lens 204. The surface on which the half-mirror 212 is deposited acts as a half-transmissive reflective surface. Each of the phase plate 213, the PBS 214, and polarizing plate 215 has a planar shape. Each of the phase plates 211 and 213 is a quarter waveplate having a phase difference of λ/4.

In this embodiment, a slow axis of the phase plate 211 is tilted by 45° to the polarization direction transmitting through the polarizing plate 210, a slow axis of the phase plate 213 is tilted by −45° to the polarization direction transmitting through the polarizing plate 210, and the polarization direction transmitting through the polarizing plate 210 and the polarization direction transmitting through the PBS 214 are orthogonal to each other. The polarization direction transmitting through the PBS 214 and the polarization direction transmitting through the polarizing plate 215 are equal to each other. In such a configuration, the light emitted from the right-eye image display element 208 passes through the polarizing plate 210, becomes linearly polarized light, passes through the phase plate 211, and becomes circularly polarized light. Thereafter, the polarized light passes through the half-mirror 212, then passes through the phase plate 213, and becomes linearly polarized light. Since the polarization direction of the linearly polarized light is orthogonal to the polarization direction transmitting through the PBS 214, the linearly polarized light is reflected by the PBS 214, passes through the phase plate 213, and becomes circularly polarized light. Thereafter, this light is reflected by the half-mirror 212, then transmits through the phase plate 213, and becomes linearly polarized light. Since the polarization direction coincides with the polarization direction transmitting through the PBS 214, the linearly polarized light is guided to the right eye 202 of the observer through the PBS 214 and the polarizing plate 215. A similar optical path is formed in the left-eye eyepiece optical system.

This embodiment disposes the polarizing plate 215 between the PBS 214 and the right eye 202 of the observer in order to reduce the ghost light of the external light and to increase the contrast of an observed image.

The thus-configured eyepiece optical system that folds the optical path using polarization as in this embodiment can make the HMD 201 thinner, reduce the focal length of the eyepiece optical system, and thus enable an image to be observed at a wide view angle.

The HMD201 is a head mount type image display apparatus, and thus lightweight may be demanded. Therefore, each lens in the eyepiece optical system may be made of a resin having a specific density smaller than that of glass. This embodiment improves the aberration correcting effect using the lenses 204, 205, 206, and 207 each made of a resin and configured as an aspherical lens.

In the eyepiece optical system according to this embodiment, the position of the exit pupil is set to a position of 30 mm, which is made by adding the eye relief (=20 mm) and a rotation radius (=10 mm) of the eyeball, and an exit pupil diameter is set to 6 mm. Thereby, even in a case where the eyeball is rotated to observe an image up, down, left, and right, the light in that direction enters the eyeball. The eye relief may be 15 mm or longer so that the observer wearing glasses can wear the HMD 201. As the eye relief becomes longer, the outer diameter of each lens becomes larger and the HMD 201 becomes larger. Therefore, the eye relief may be 25 mm or less.

Figure 11:
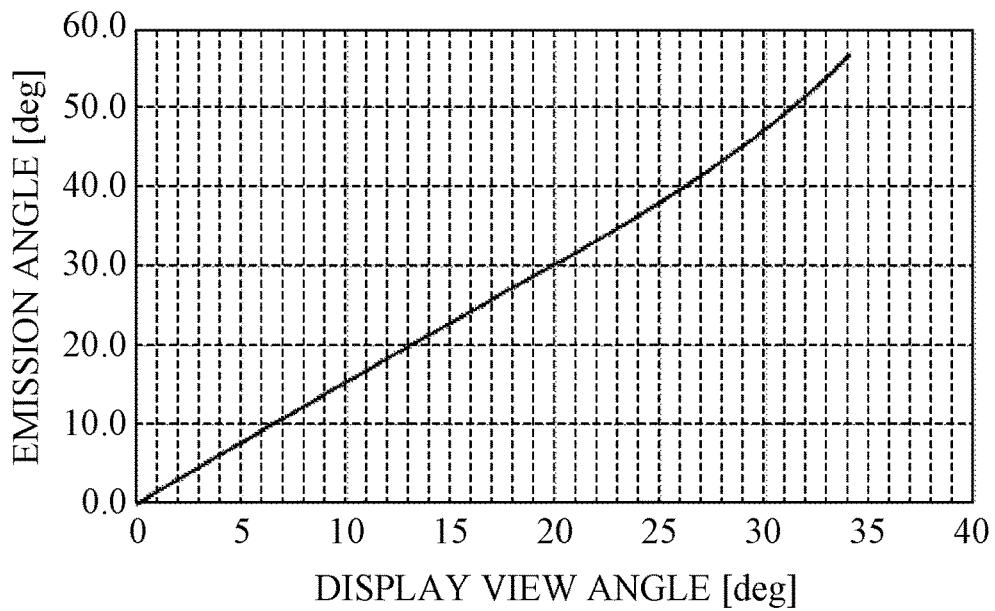
FIG. 11 explains an emission angle of light emitted from the image display element according to the second embodiment.

Since the eyepiece optical system according to this embodiment has a short focal length and is thin, the emission angle of light emitted from the peripheral portion of the image display element to the exit pupil of the eyepiece optical system is large. FIG. 11 explains the emission angle of the light emitted from the image display element according to this embodiment, and illustrates a relationship between the display view angle and the emission angle of the light emitted from the image display element to the exit pupil. The emission angle of the light emitted from the image display element is the emission angle of the principal ray guided to the center of the exit pupil. As illustrated in FIG. 11, as the display view angle increases, the emission angle increases, and both emission angles of the light emitted from the horizontal end and the vertical end of the image display element are 47 degrees. In order to shorten the focal length of the eyepiece optical system and to make thinner the HMD 201, the emission angle of the light emitted from the image display element to the center of the exit pupil may be 30 degrees or larger.

Figure 12:
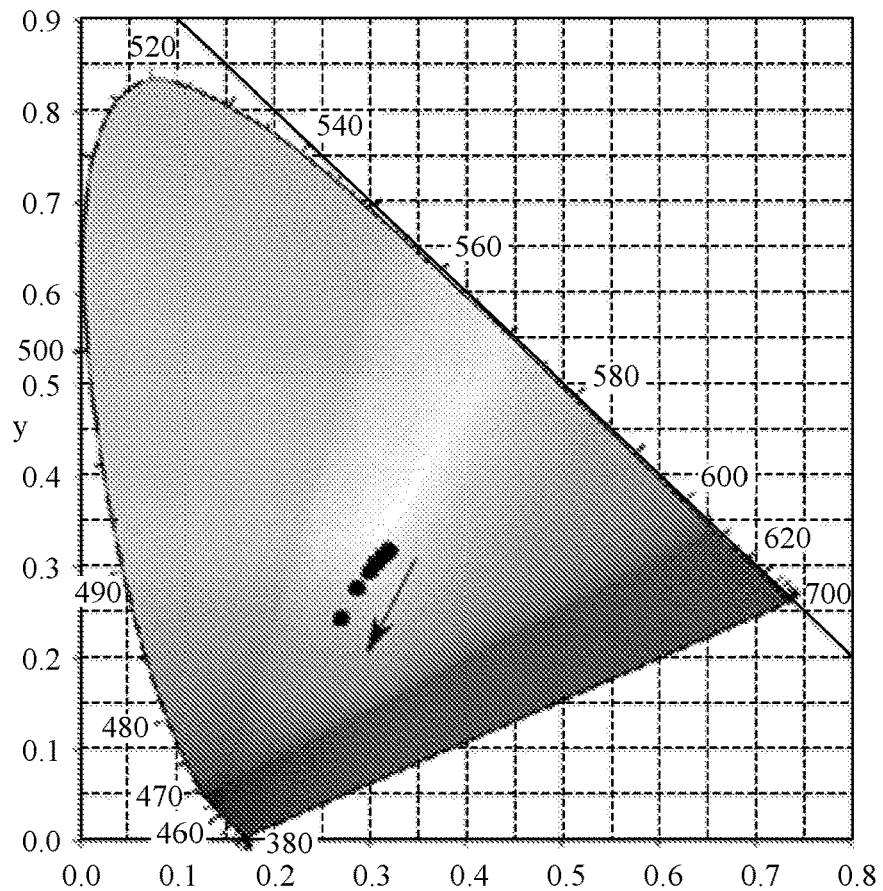
FIG. 12 explains color drift of the image display element according to the second embodiment.

As the emission angle of the light emitted from the image display element increases, color drift occurs due to the interference of the light emitting layer of the organic EL and the influence of the color mixing of the color filter. In this embodiment, as the emission angle of the light emitted from the image display element increases, the chromaticity changes toward blue and color drift occurs, as illustrated in FIG. 12. Therefore, in a case where the observer observes a white image, blue is observed in the peripheral portion of the image and thus the image cannot be observed naturally.

Figure 13B:
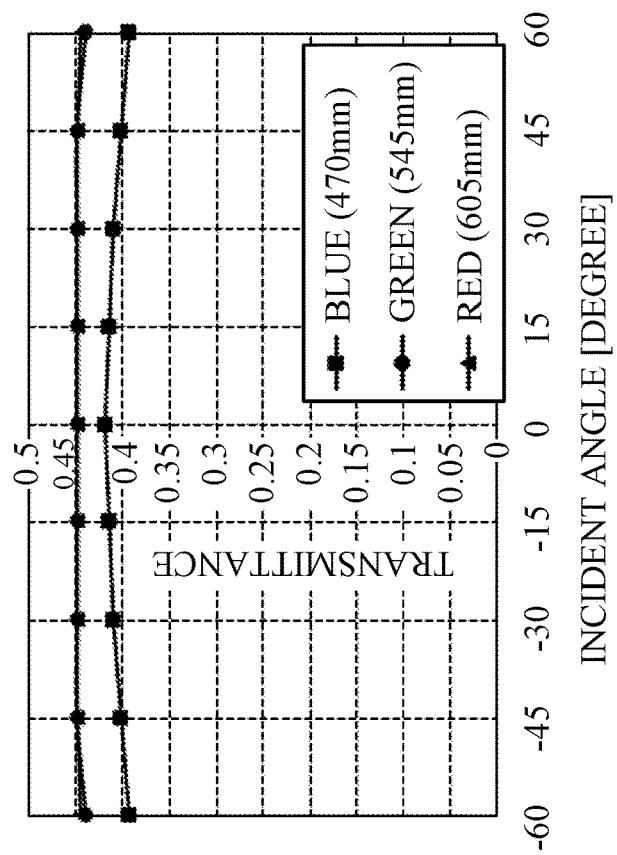
FIGS. 13A and 13B explain a characteristic of the polarizing plate according to the second embodiment.
Figure 13A:
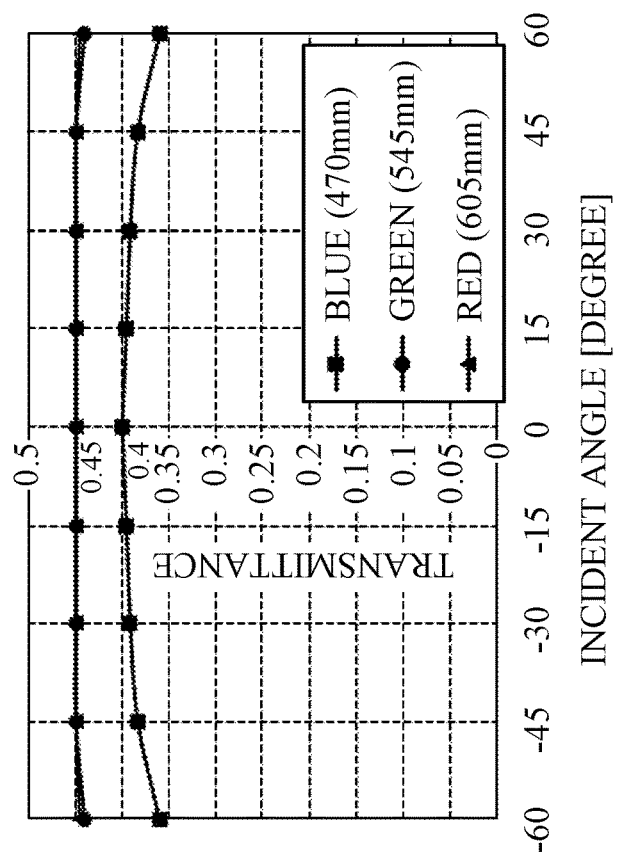

Accordingly, this embodiment makes at least one of the polarizing plates 210 and 215 function as a correction element having different characteristics between the central portion and an area (peripheral portion) different from the central portion. More specifically, at least one of the polarizing plates 210 and 215 has such a characteristic that the spectral transmittance is different between the central portion and the peripheral portion. Thereby, after the first light emitted from the central portion of the right-eye image display element 208 and the second light emitted from the outermost peripheral portion of the right-eye image display element 208 pass through the right-eye eyepiece optical system, color drift of the second light from the first light can be made less than color drift of the second light from the first light before the first light and the second light pass through the right-eye eyepiece optical system. That is, the color drift in the peripheral portion of the right-eye image display element 208 can be canceled. FIGS. 13A and 13B explain the characteristics of the polarizing plates 210 and 215. FIGS. 13A and 13B illustrate the transmittances (spectral transmittance) of the polarizing plates 210 and 215 to light at an incident angle of 0 degrees for each wavelength, respectively. The blue dominant wavelength of the image display element is 470 nm, the green dominant wavelength is 545 nm, and the red dominant wavelength is 605 nm. FIGS. 13A and 13B illustrate the transmittances at each wavelength. The blue wavelength (first wavelength) may be included in a range from 430 nm to 480 nm. The green wavelength (second wavelength) may be included in a range from 520 nm to 570 nm. The red wavelength (third wavelength) may be included in a range from 600 nm to 650 nm.

As illustrated in FIG. 13A, the transmittances to green and red lights of the polarizing plate 210 change little even if the incident angle increases, but the transmittance to blue light decreases as the incident angle increases. The transmittance of the polarizing plate 215 shows a similar tendency. The light emitted from the peripheral portion of the right-eye image display element 208 has a large emission angle and large incident angles on the polarizing plates 210 and 215. Thus, as the blue color-drifted light emitted from the peripheral portion of the right-eye image display element 208 passes through the polarizing plates 210 and 215, the intensity of the blue color and its color drift can be reduced.

Figure 14:
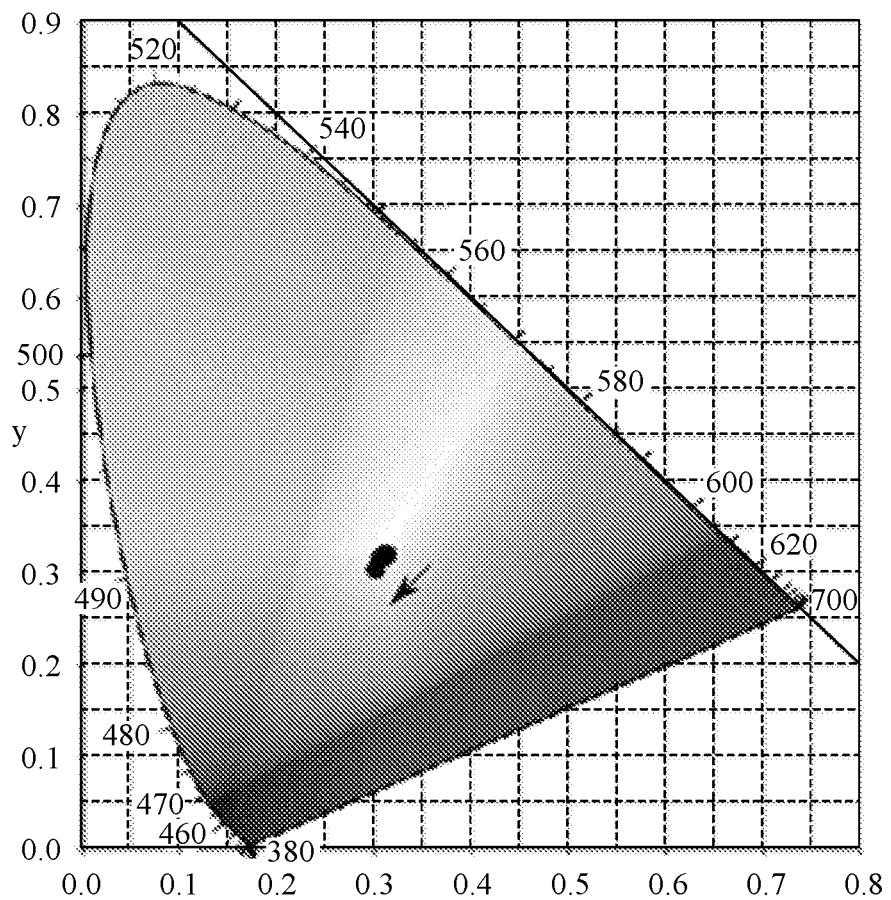
FIG. 14 explains color drift of the eyepiece optical system according to the second embodiment.

FIG. 14 explains the color drift of the eyepiece optical system, and illustrates a relationship between the emission angle and the chromaticity after the light passes through the eyepiece optical system. With the image display element alone, as the emission angle increases, the chromaticity changes toward blue as illustrated in FIG. 12, but in a case where the light passes through the eyepiece optical system, the chromaticity change becomes smaller as illustrated in FIG. 14 and the color drift can be reduced. In this embodiment, the chromaticity difference x is 0.055 and the chromaticity difference y is 0.07 on the chromaticity coordinate system as the emission angle increases in the image display element alone, but the chromaticity difference x can be reduced down to 0.015 and the chromaticity difference y can be reduced down to 0.02 after the light passes through the eyepiece optical system. In order for the observer to hardly notice color drift and naturally observe an image, the chromaticity difference x may be 0.05 or less and the chromaticity difference y may be 0.05 or less on the chromaticity coordinate system.

In this embodiment, a wavelength at which a ratio of the intensity of the light emitted from the peripheral portion of the image display element to the exit pupil to the intensity of the light emitted from the central portion of the image display element to the exit pupil becomes maximum is 470 nm that is a blue dominant wavelength, and blue color drift occurs as the emission angle increases. Accordingly, color drift of the image display element can be canceled by setting to blue, among the red, green, and blue wavelengths, a wavelength at which the transmittances of the polarizing plates 210 and 215 are minimum. Thus, the color drift of the peripheral portion of the image display element from the central portion of the image display element is reduced by such characteristics of the polarizing plates 210 and 215 as the color correction elements that the spectral transmittance is different between each central portion and each peripheral portion, and thereby the observer can observe a more natural image.

The right-eye eyepiece optical system according to this embodiment has an emission angle of 47 degrees of the light emitted from the horizontal end of the right-eye image display element 208 and half a horizontal display view angle of 30 degrees, and an incident angle on the polarizing plate 210 is larger than that on the polarizing plate 215. Thus, the emission angle characteristic of the image display element may be canceled by the characteristic of the polarizing plate 210 close to the right-eye image display element 208. The half display view angle is larger than the emission angle of the light emitted from the horizontal end of the right-eye image display element 208, and the incident angle on the polarizing plate 215 may be larger than the incident angle on the polarizing plate 210. In this case, the emission angle characteristic of the right-eye image display element 208 may be canceled by the characteristic of the polarizing plate 215.

In this embodiment, the color drift caused by the emission angle of the light emitted from the image display element is canceled by the characteristic of the polarizing plate, but may be canceled by the characteristic of the phase plate. In that case, in order to change the transmittance and reflectance in a case where the polarizing plate or PBS is combined, a transmittance (spectral transmittance) for each wavelength of the phase plate may be changed, or a phase amount for each wavelength of the phase plate may be changed.

The color drift caused by the emission angle of the light emitted from the image display element may be canceled by the characteristic in which at least one of the spectral transmittance and the spectral reflectance is different between the central portion of the half-mirror and an area different from the central portion of the half-mirror. In that case, as illustrated in FIG. 9, an incident-angle difference during light transmission through the half-mirror between the light emitted from the central portion of the image display element and the light emitted from the peripheral portion of the image display element is large, but an incident-angle difference during light reflection on the half-mirror is small. Thus, the color drift may be canceled by the characteristic during the light transmission through the half-mirror.

In this embodiment, a large emission angle of the light emitted from the image display element causes color drifts to blue regardless of the emission direction of the light. Since the colors to be drifted are the same, it is unnecessary to change the characteristic of the polarizing plate according to the incident direction. Since the colors to be drifted are blue, which is a color having low human luminous efficiency, the color drift felt by the observer is small even if the intensity of the light emitted from the image display element becomes higher.

Figure 15B:
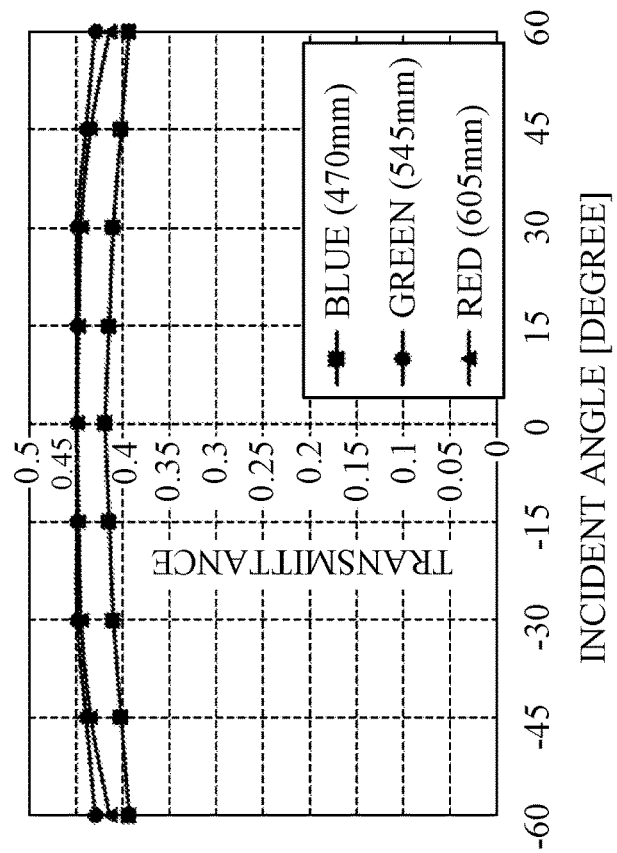
FIGS. 15A and 15B illustrate an example of a characteristic of the polarizing plate according to the second embodiment.
Figure 15A:
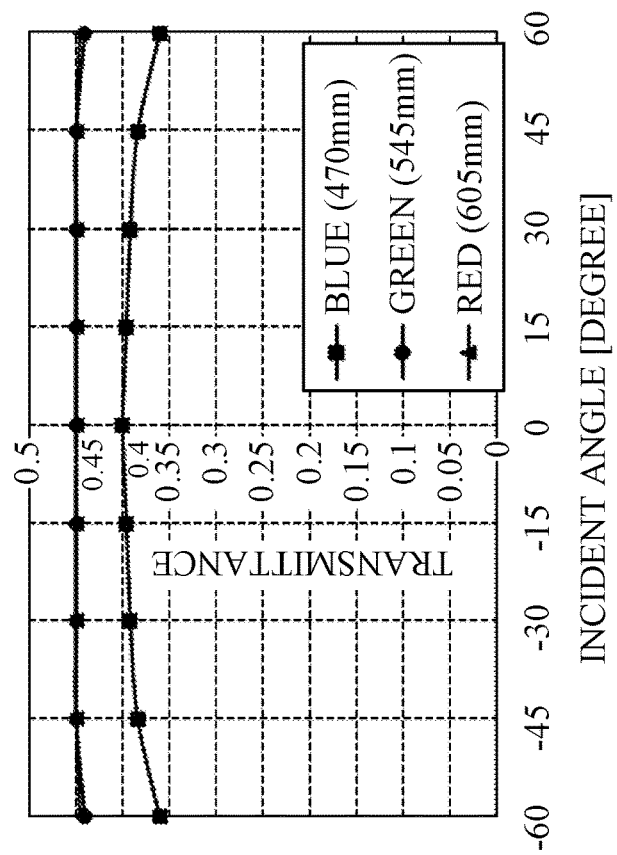

In a case where the polarizing plate 210 has characteristics that are different between the horizontal direction and the vertical direction, the human visual field in the horizontal direction is wider than that in the vertical direction and the observer is likely to notice color drift in the horizontal direction, so that the characteristic that makes smaller the color drift in the horizontal direction may be used. For example, the characteristic in the horizontal direction may be set as illustrated in FIG. 15A having a high blue canceling effect, and the characteristic in the vertical direction may be set as illustrated in FIG. 15B. In a case where the polarizing plate 215 has characteristics that are different between the horizontal direction and the vertical direction, the characteristics may be set so as to make smaller the color drift in the horizontal direction.

This embodiment reduces the chromaticity drift in a case of the large emission angle of the light emitted from the right-eye image display element 208, but may set the characteristics of the polarizing plates 210 and 215 so as to reduce the drift of the color difference $\Delta E^*$. In that case, the absolute values of the transmittance and the reflectance for each color may be changed.

In this embodiment, the surface on which the half-mirror 112 of the lens 204 is deposited is a convex surface that is convex toward the right-eye image display element 208. Depositing the half-mirror 212 on the convex surface can realize a wide view angle while thinning the HMD 201. Forming the convex surface on which the half-mirror 212 is vapor-deposited into an aspherical shape can enhance the aberration correcting effect.

In this embodiment, since the lenses 204 and 205 are cemented, the surface on which the half-mirror 212 is vapor-deposited may be the surface on the side of the right eye 202 of the observer of the lens 205. Even in that case, the surface on which the half-mirror 212 is vapor-deposited is a convex surface that is convex toward the right-eye image display element 208.

Since this embodiment compromises a longer eye relief and the thinner HMD 201, the surface on the side of the right eye 202 of the observer on which the phase plate 213 and the PBS 214 of the lens 204 are formed is set to be planar.

In this embodiment, each of the phase plates 211 and 213 is a quarter waveplate having a phase difference of $\lambda/4$, but the phase difference may shift from $\lambda/4$ so as to cancel the birefringences of the lenses 204 and 205. In this case, a sum of the phase differences of the lens 204 and the phase plate 213 may be $3\lambda/20$ or more and $7\lambda/20$ or less. In addition, a sum of the phase differences of the lens 205 and the phase plate 211 may be $3\lambda/20$ or more and $7\lambda/20$ or less. If each value is out of the above range, the intensity of ghost light will increase and a more natural image cannot be observed.

Third Embodiment

Figure 16:
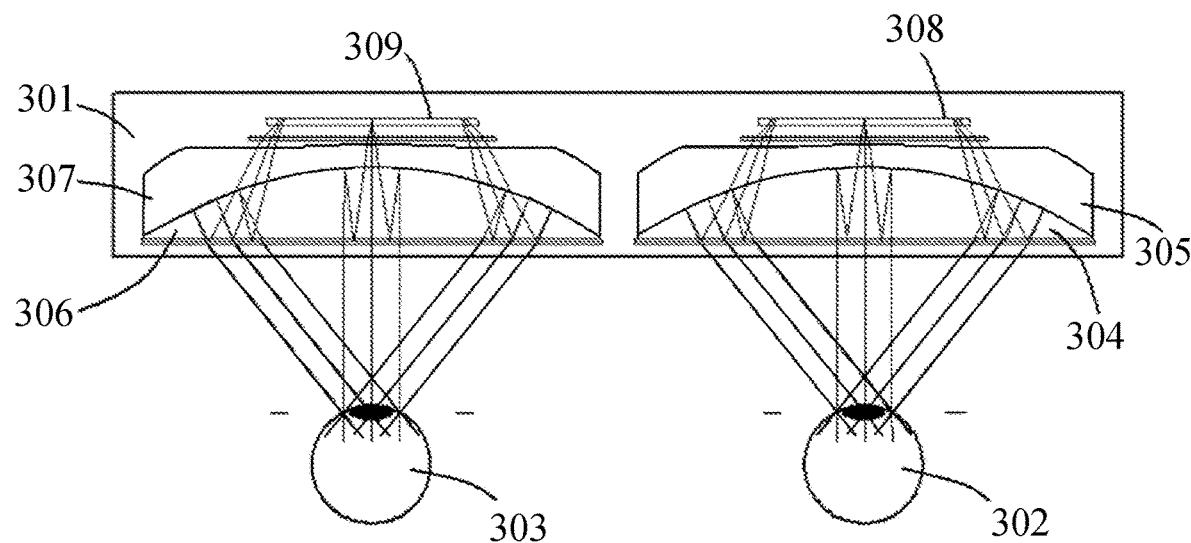
FIG. 16 explains a head mount display as an example of an image display apparatus according to a third embodiment.

FIG. 16 explains a head mount display (HMD hereinafter) 301 as an example of the image display apparatus according to this embodiment. The HMD 301 includes lenses 304, 305, 306, and 307, a right-eye image display element 308, and a left-eye image display element 309. The lenses 304 and 305 constitute a right-eye eyepiece optical system, and the lenses 306 and 307 constitute a left-eye eyepiece optical system. The lenses 304 and 305 and the lenses 306 and 307 are cemented lenses and can be easily held. Each of the right-eye image display element 308 and the left-eye image display element 309 is an organic EL display.

The right-eye eyepiece optical system magnifies and projects the original image displayed on the right-eye image display element 308 as a virtual image and guides it to a right eye 302 of the observer. The left-eye eyepiece optical system magnifies and projects the original image displayed on the left-eye image display element 309 as a virtual image and guides it to a left eye 303 of the observer. Each of the right-eye eyepiece optical system and the left-eye eyepiece optical system has a focal length of 13 mm, a horizontal display view angle of 60°, a vertical display view angle of 60°, and a diagonal display view angle of 78°. A distance (eye relief) between the HMD 301 and the observer's eyeball is 20 mm.

Figure 17:
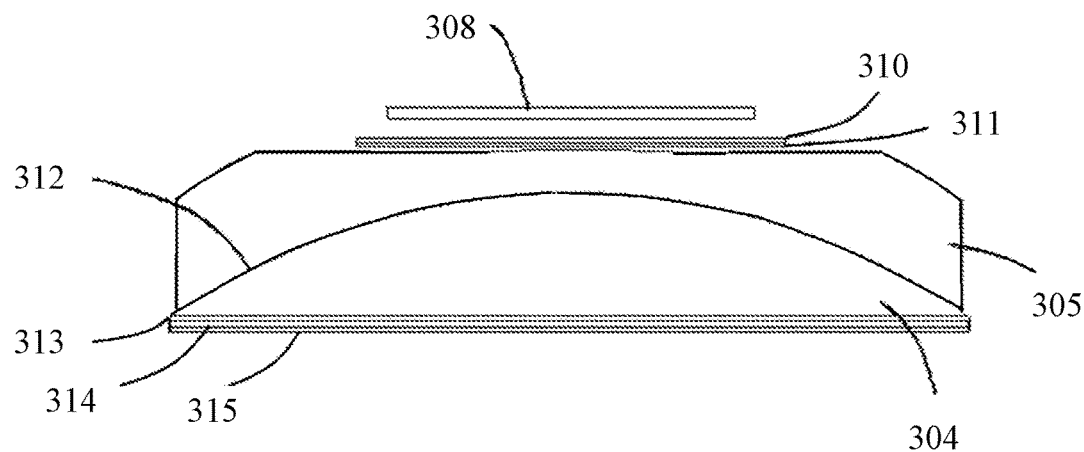
FIG. 17 explains a right-eye eyepiece optical system according to the third embodiment.

The eyepiece optical system according to this embodiment has a configuration that folds an optical path using polarization. The optical path of the eyepiece optical system will be described with reference to the right-eye eyepiece optical system. FIG. 17 explains the right-eye eyepiece optical system according to this embodiment. The right-eye eyepiece optical system includes, in this order from the side of the right-eye image display element 308, a polarizing plate (first polarizing plate) 310, a phase plate (first phase plate) 311, the lenses 305 and 304, a phase plate (second phase plate) 313, a polarizing beam splitter (hereinafter referred to as PBS) 314, and a polarizing plate (second polarizing plate) 315. A half-mirror 312 is deposited on the surface on the side of the lens 305 of the lens 304. The surface on which the half-mirror 312 is deposited acts as a half-transmissive reflective surface. Each of the phase plate 313, PBS 314, and polarizing plate 315 has a planar shape. Each of the phase plates 311 and 313 is a quarter waveplate having a phase difference of $\lambda/4$. Since the optical path of the eyepiece optical system is similar to that of the first or second embodiment, a description thereof will be omitted.

Since the eyepiece optical system according to this embodiment has a short focal length and is thin, the emission angle of light emitted from the peripheral portion of the image display element to the exit pupil of the eyepiece optical system is large and both emission angles of the light emitted from the horizontal end and the vertical end of the image display element are 47 degrees. In order to shorten the focal length of the eyepiece optical system and to make thinner the HMD 301, the emission angle of the light emitted from the peripheral portion of the image display element to the center of the exit pupil may be 30 degrees or more.

As the emission angle of the light emitted from the image display element increases, color drift occurs due to the interference of the light emitting layer of the organic EL and the influence of the color mixing of the color filter. In this embodiment, as the emission angle of the light emitted from the image display element increases, blue color drift occurs at the right end of the displayed screen and red color drift occurs at the left end due to the color mixing of the color filters. Therefore, in a case where the observer observes a white image, red or blue is observed in the peripheral portion of the image and thus the image cannot be observed naturally.

Figure 18:
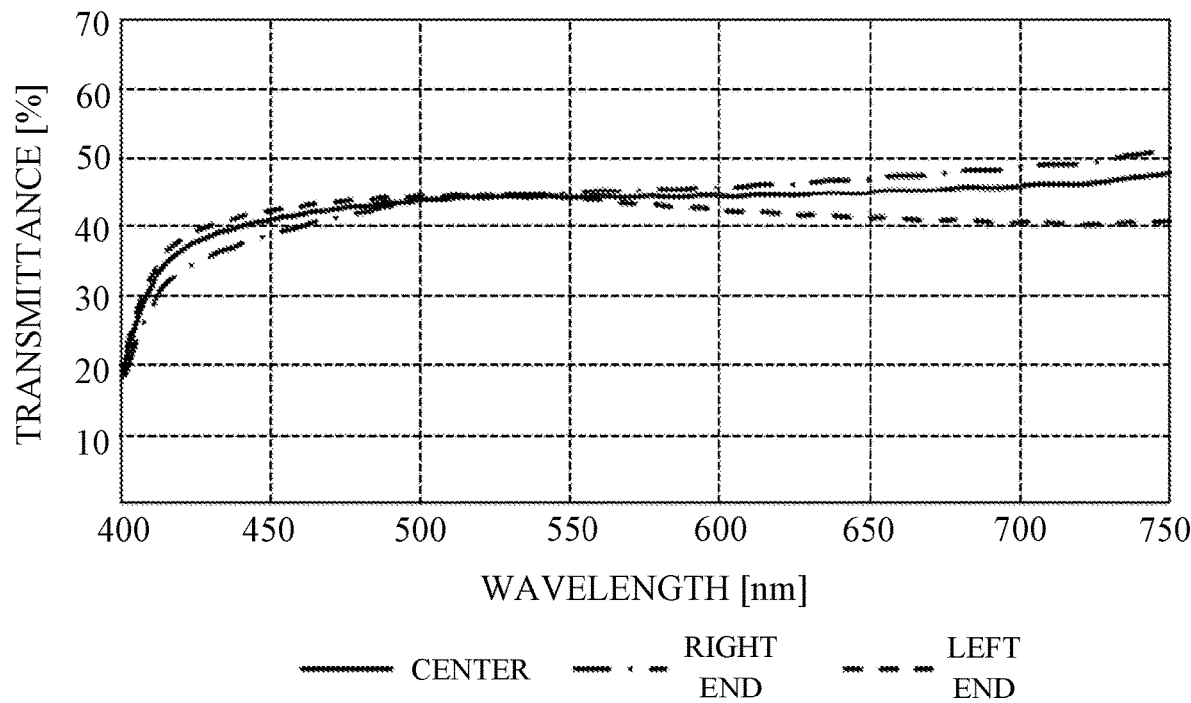
FIG. 18 explains a characteristic of a polarizing plate according to the third embodiment.

Accordingly, this embodiment makes the polarizing plate 310 function as a correction element having different characteristics between the central portion and an area (peripheral portion) different than the central portion. More specifically, the polarizing plate 310 has such a characteristic that the spectral transmittance is different among the central portion, the right end of the peripheral portion, and the left end of the peripheral portion. Thereby, after the first light emitted from the central portion of the right-eye image display element 308 and the second light emitted from the outermost peripheral portion of the right-eye image display element 308 pass through the right-eye eyepiece optical system, color drift of the second light from the first light can be made less than color drift of the second light from the first light before the first light and the second light pass through the right-eye eyepiece optical system. That is, the blue color drift at the right end of the peripheral portion of the right-eye image display element 308 and the red color drift at the left end of the peripheral portion of the right-eye image display element 308 can be canceled. FIG. 18 explains the characteristic of the polarizing plate 310, and illustrates the spectral transmittance of the central portion, the spectral transmittance at the right end of the peripheral portion, and the spectral transmittance at the left end of the peripheral portion of the polarizing plate 310. As illustrated in FIG. 18, the transmittance of the wavelength on the blue side is made lower at the right end, and the transmittance of the wavelength on the red side is lower at the left end than the transmittance at the center of the polarizing plate 310. Therefore, as the blue color-drifted light emitted from the right end of the image display element passes through the right end of the polarizing plate 310, the intensity of its blue color and its blue color drift can be reduced. As the red color-drifted light emitted from the left end of the right-eye image display element 308 passes through the left end of the polarizing plate 310, the intensity of its red color and its red color drift can be reduced. The blue dominant wavelength of the right-eye image display element 308 is 470 nm, the green dominant wavelength is 545 nm, and the red dominant wavelength is 605 nm. The blue wavelength (first wavelength) may be included in a range from 430 nm to 480 nm. The green wavelength (second wavelength) may be included in a range from 520 nm to 570 nm. The red wavelength (third wavelength) may be included in a range from 600 nm to 650 nm.

As described above, the color drift of the peripheral portion from the central portion of the right-eye image display element 308 can be reduced by changing the spectral transmittance between the central portion and the peripheral portion of the polarizing plate 310 that is a color correction element and thus the observer can observe a more natural image.

In this embodiment, as illustrated in FIG. 16, a light beam width of the polarizing plate 310 close to the right-eye image display element 308 is so small that it is easy to separate each view angle, and thus the emission angle characteristic of the right-eye image display element 308 may be canceled by the characteristic of each location of the polarizing plate 310.

In this embodiment, the color drift caused by the emission angle of the light emitted from the image display element is canceled by the characteristic of the polarizing plate, but may be canceled by the characteristic of the phase plate. In that case, in order to change the transmittance and reflectance in a case where the polarizing plate or PBS is combined, a transmittance (spectral transmittance) for each wavelength of the phase plate may be changed, or a phase amount for each wavelength of the phase plate may be changed.

The color drift caused by the emission angle of the light emitted from the image display element may be canceled by the characteristic in which at least one of the spectral transmittance and the spectral reflectance is different between the central portion of the half-mirror and an area different from the central portion of the half-mirror. In that case, as illustrated in FIG. 16, since a light beam width of the light from the image display element is so small that it is easy to separate each view angle, the color drift may be canceled by the characteristic of each location of the half-mirror.

Fourth Embodiment

Figure 19:
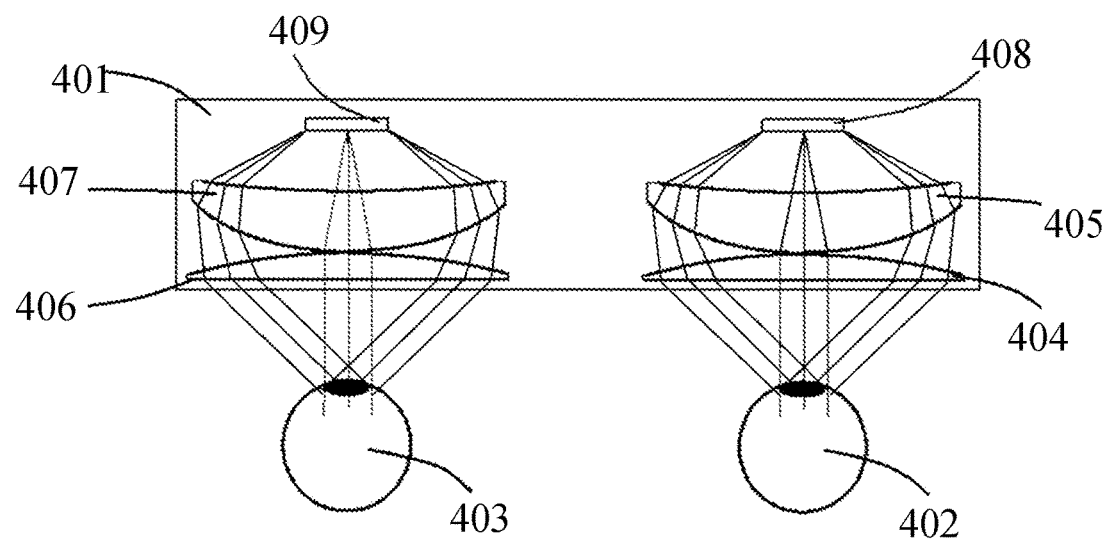
FIG. 19 explains a head mount display as an example of an image display apparatus according to a fourth embodiment.

FIG. 19 explains a head mount display (HMD hereinafter) 401 as an example of the image display apparatus according to this embodiment. The HMD 401 includes lenses 404, 405, 406, and 407, a right-eye image display element 408, and a left-eye image display element 409. The lenses 404 and 405 constitute a right-eye eyepiece optical system, and the lenses 406 and 407 constitute a left-eye eyepiece optical system. Each of the right-eye image display element 408 and the left-eye image display element 409 is an organic EL display.

The right-eye eyepiece optical system magnifies and projects the original image displayed on the right-eye image display element 408 as a virtual image and guides it to a right eye 402 of the observer. The left-eye eyepiece optical system magnifies and projects the original image displayed on the left-eye image display element 409 as a virtual image and guides it to a left eye 403 of the observer. Each of the right-eye eyepiece optical system and the left-eye eyepiece optical system has a focal length of 10 mm, a horizontal display view angle of 90°, a vertical display view angle of 90°, and a diagonal display view angle of 110°. A distance (eye relief) between the HMD 401 and the observer's eyeball is 12 mm.

The eyepiece optical system according to this embodiment has a configuration that folds an optical path by using polarization. Since the configuration is similar to that of the first embodiment, a detailed description thereof will be omitted.

Since the eyepiece optical system according to this embodiment has a short focal length and is thin, the emission angle of light emitted from the peripheral portion of the image display element to the exit pupil of the eyepiece optical system is large, and both emission angles of the light emitted from the horizontal end and the vertical end of the image display element are 60 degrees. In order to shorten the focal length of the eyepiece optical system and to make thinner the HMD 401, the emission angle of the light emitted from the peripheral portion of the image display element to the center of the exit pupil may be 30 degrees or more.

As the emission angle of the light emitted from the image display element increases, color drift occurs due to the interference of the light emitting layer of the organic EL and the influence of the color mixing of the color filter. In this embodiment, as the emission angle of the light emitted from the image display element increases, blue color drift occurs in the peripheral portion of the display screen (image) due to the color mixing of the color filters. Therefore, in a case where the observer observes a white image, blue is observed in the peripheral portion of the image and thus the image cannot be observed naturally.

Accordingly, this embodiment makes at least one of the lenses 405 and 407 function as a correction element having different characteristics between the central portion and an area (peripheral portion) different from the central portion. More specifically, an antireflection film deposited on a curved surface on the side of the image display element of each of the lenses 405 and 407 has such a characteristic that the spectral transmittance is different between the central portion and the peripheral portion. Thereby, after the first light emitted from the central portion of the right-eye image display element and the second light emitted from the outermost peripheral portion of the right-eye image display element pass through the right-eye eyepiece optical system, color drift of the second light from the first light can be made less than color drift of the second light from the first light before the first light and the second light pass through the right-eye eyepiece optical system. That is, the color drift in the peripheral portion of the image display element can be canceled.

As described above, the color drift of the peripheral portion from the central portion of the image display element can be reduced by changing the spectral transmittance between the central portion and the peripheral portion of the antireflection film of each of the lenses 405 and 407 that are the color correction elements and thus the observer can observe the image more naturally.

Since the curved surface on the side of the image display element of each of the lenses 405 and 407 has a large difference between the incident angle of the light emitted from the central portion of the image display element and the incident angle of the light emitted from the peripheral portion of the image display element, color drift may be canceled by the characteristic of the antireflection film deposited on the curved surface on the side the image display element of each of the lenses 405 and 407. An antireflection film having a similar characteristic may be deposited on both sides of each of the lenses 404 and 406 and on the surface on the observer side of each of the lenses 405 and 407. In that case, the effect of reducing color drift can be enhanced.

In addition, since cover glass of the image display element has a large difference between the incident angle of light emitted from the central portion of the image display element and the incident angle of light emitted from the peripheral portion, an antireflection film may be deposited on the cover glass such that the transmittance of the blue wavelength may reduce as the incident angle increases.

Figure 20:
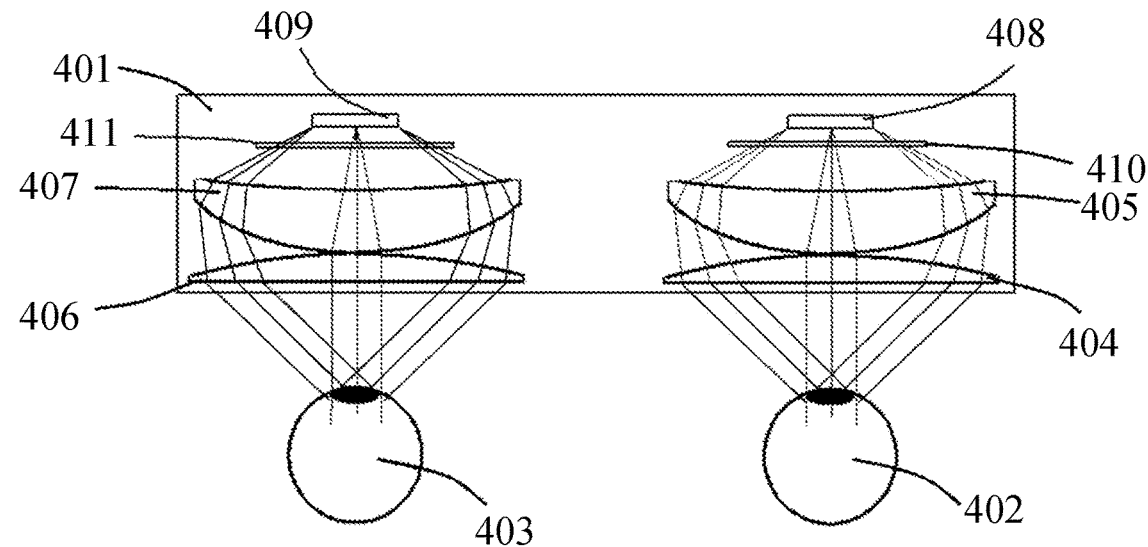
FIG. 20 explains a head mount display as another example of the image display apparatus according to the fourth embodiment.

As illustrated in FIG. 20, color correction elements 410 and 411 are disposed between the right-eye image display element 408 and the lens 405 and between the left-eye image display element 409 and the lens 407 such that the color drift in the peripheral portion may be canceled by the characteristic of the correction elements 410 and 411. At that time, the color correction elements 410 and 411 have characteristics such that the transmittance of the blue wavelength decreases as the incident angle increases.

In a case where a color to be drifted is different depending on the location of the display screen (image) such that blur color drift occurs at the right end and red color drift occurs at the left end as in the third embodiment, the characteristic of the antireflection film of each of the lenses 405 and 407 may be changed among the center portion, the right end of the peripheral portion, and the left end of the peripheral portion. More specifically, the transmittance of the wavelength on the blue side is made lower at the right end, and the transmittance of the wavelength on the red side may be made lower at the left end than the transmittance at the center of the antireflection film. Thereby, as the blue color drifted light emitted from the right end of the image display element passes through the right end of each of the lenses 405 and 407, the intensity of its blue color and the blue color drift can be reduced. As the red color drifted light emitted from the left end of the image display element passes through the left end of each of the lenses 405 and 407, the intensity of its red color and the red color drift can be reduced. Even in this case, the color drift may be reduced by changing, between the right end and the left end with respect to the center, the spectral transmittance of the antireflection film of each of the lenses 404 and 406, the transmittance of the antireflection film of the cover glass, or the transmittances of the color correction elements 410 and 411.

Fifth Embodiment

Figure 21:
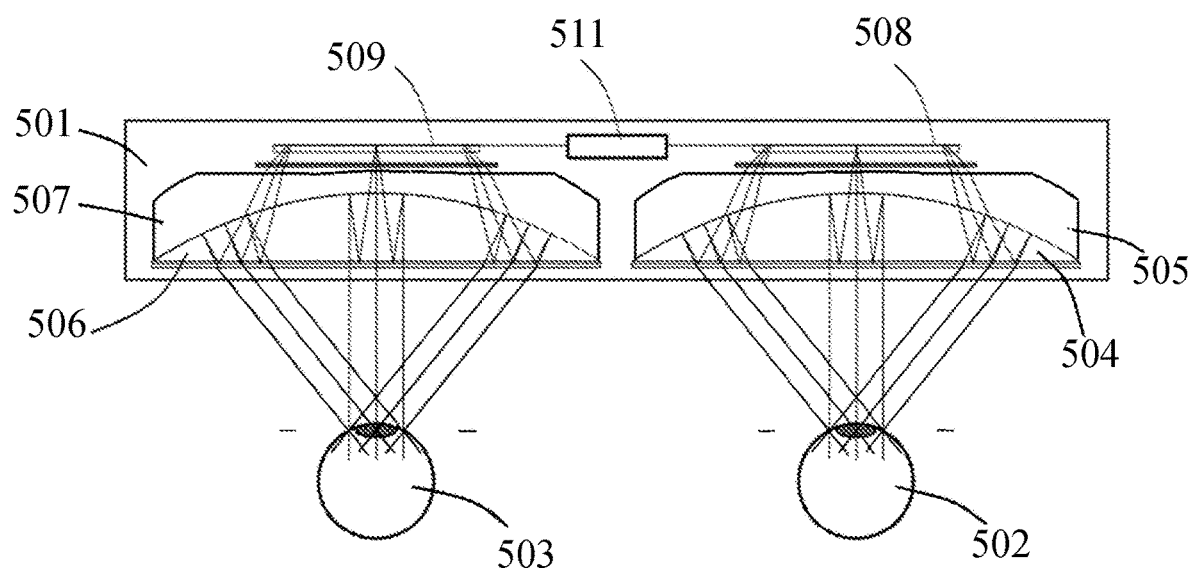
FIG. 21 explains a head mount display as an example of an image display apparatus according to a fifth embodiment.
Figure 22:
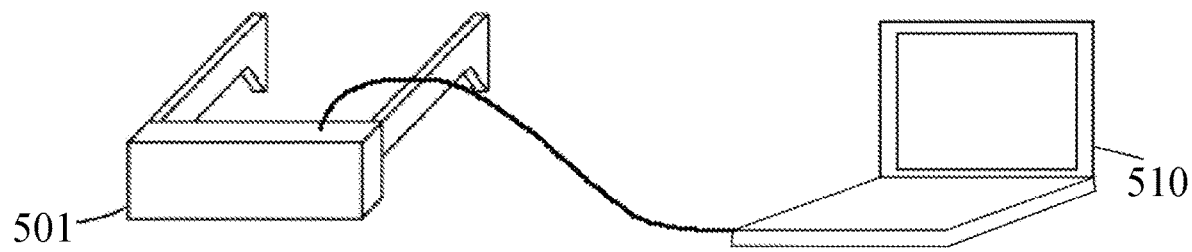
FIG. 22 illustrates the head mount display according to the fifth embodiment connected to a PC.

FIG. 21 explains a head mount display (HMD hereinafter) 501 as an example of the image display apparatus according to this embodiment. FIG. 22 illustrates the HMD 501 connected to a PC 510.

The HMD 501 includes lenses 504, 505, 506, and 507, a right-eye image display element 508, a left-eye image display element 509, and an image processing unit 511. The lenses 504 and 505 constitute a right-eye eyepiece optical system, and the lenses 506 and 507 constitute a left-eye eyepiece optical system. The lenses 504 and 505 and the lenses 506 and 507 are cemented lenses and can be easily held. Each of the right-eye image display element 508 and the left-eye image display element 509 is an organic EL display.

The right-eye eyepiece optical system magnifies and projects the original image displayed on the right-eye image display element 508 as a virtual image and guides it to a right eye 502 of the observer. The left-eye eyepiece optical system magnifies and projects the original image displayed on the left-eye image display element 509 as a virtual image and guides it to a left eye 503 of the observer. Each of the right-eye eyepiece optical system and the left-eye eyepiece optical system has a focal length of 13 mm, a horizontal display view angle of 60°, a vertical display view angle of 60°, and a diagonal display view angle of 78°. A distance (eye relief) between the HMD 501 and the observer's eyeball is 20 mm.

The eyepiece optical system according to this embodiment has a configuration that folds an optical path using polarization. Since the configuration is similar to that of the second embodiment, a detailed description thereof will be omitted.

Since the eyepiece optical system according to this embodiment has a short focal length and is thin, the emission angle of light emitted from the peripheral portion of the image display element to the exit pupil of the eyepiece optical system is large, and both emission angles of the light emitted from the horizontal end and the vertical end of the image display element are 47 degrees. In order to shorten the focal length of the eyepiece optical system and to make thinner the thinning of the HMD 501, the emission angle of the light emitted from the peripheral portion of the image display element to the center of the exit pupil may be 30 degrees or more.

As the emission angle of the light emitted from the image display element increases, color drift occurs due to the interference of the light emitting layer of the organic EL and the influence of the color mixing of the color filter. In this embodiment, as the emission angle of the light emitted from the image display element increases, blue color drift occurs in the peripheral portion of the display screen (image) due to the color mixing of the color filters. Therefore, in a case where the observer observes a white image, blue is observed in the peripheral portion in the image and thus the image cannot be observed naturally.

Accordingly, this embodiment cancels the color drift of the peripheral portion by changing the characteristic between the central portion and the peripheral portion of the image displayed on the image display element. The image displayed on the image display element has a white balance based on the spectral transmittance of the eyepiece optical system. Usually, the white balance is the same on the entire surface of the image display element. In this embodiment, color drift occurs in the peripheral portion from the central portion, and thus the color drift in the peripheral portion is reduced by changing the white balance between the central portion and the peripheral portion by the image processing unit 511. In consideration of a blue color drifted image in the peripheral portion, this embodiment adjusts the white balance in the peripheral portion so as to make larger the gains of red and green than the gain of blue and to make yellower the image in the peripheral portion than the image at the center. Thereby, the white balance of the image displayed in the peripheral portion of the image display element is yellower than the image displayed in the central portion, and the blue color drift is caused by the large emission angle, and thus the emitted image becomes an image in which color drift is reduced in the central portion.

Here, the blue dominant wavelength of the image display element is 470 nm, the green dominant wavelength is 545 nm, and the red dominant wavelength is 605 nm. The blue wavelength (first wavelength) may be included in a range from 430 nm to 480 nm. The green wavelength (second wavelength) may be included in a range from 520 nm to 570 nm. The red wavelength (third wavelength) may be included in a range from 600 nm to 650 nm.

In this embodiment, a wavelength at which a ratio of the intensity of the light emitted from the peripheral portion of the image display element to the exit pupil to the intensity of the light emitted from the central portion of the image display element to the exit pupil becomes maximum is 470 nm that is a blue dominant wavelength, and blue color drift occurs as the emission angle increases. Accordingly, color drift of the image display element can be canceled by setting to blue, among the red, green, and blue wavelengths, a wavelength at which the ratio of the peripheral gain to the central gain of the image display element becomes minimum. Thus, the color drift of the peripheral portion from the central portion of the image display element is reduced by changing the white balance between the central portion and the peripheral portion, and the observer can observe a more natural image. The white balance of the peripheral portion relative to the central portion may be changed gradually from the central portion to the peripheral portion or only in the outermost peripheral portion. In a case where the color drift of the peripheral portion is blue regardless of the location as in this embodiment, a gain value for each color to be changed from the central portion to the peripheral portion may be stored as a function of a distance from the central portion. In that case, the required memory capacity can be made smaller than a case of storing a data map.

In this embodiment, the image processing unit 511 changes the white balance, but the PC 510 that generates the display image of the HMD 501 may change the white balance. In this case, since the processing inside the HMD 501 is reduced, the power consumption of the image processing unit 511 can be reduced.

If the image display element is a liquid crystal display and color drift in the peripheral portion depends on the location such that blue color drift occurs at the right end and red color drift occurs at the left end, the color drift can be reduced by changing the characteristic between the right end and the left end. In this case, since the image at the right end is color drifted to blue, the white balance at the right end is adjusted so as to make larger the gains of red and green than the gain of blue and to make yellower the image at the right end than the image at the center. Since the image at the left end is color drifted to red, the white balance at the left end is adjusted so as to make larger the gains of green and blue than the gain of red and to make blue-greener (cyan) the image at the left end than the image at the center. Thereby, the white balance for the image displayed at the right end of the image display element is yellower than at the center, the blue color drift is caused by the large emission angle, and thus color drift at the right end in the emitted image is reduced in comparison with the center. The white balance for the image displayed at the left end of the image display element is more blue-green than at the center, the red color drift is caused by the large emission angle, and thus color drift at the left end in the emitted image is reduced in comparison with the center.

Sixth Embodiment

Figure 23:
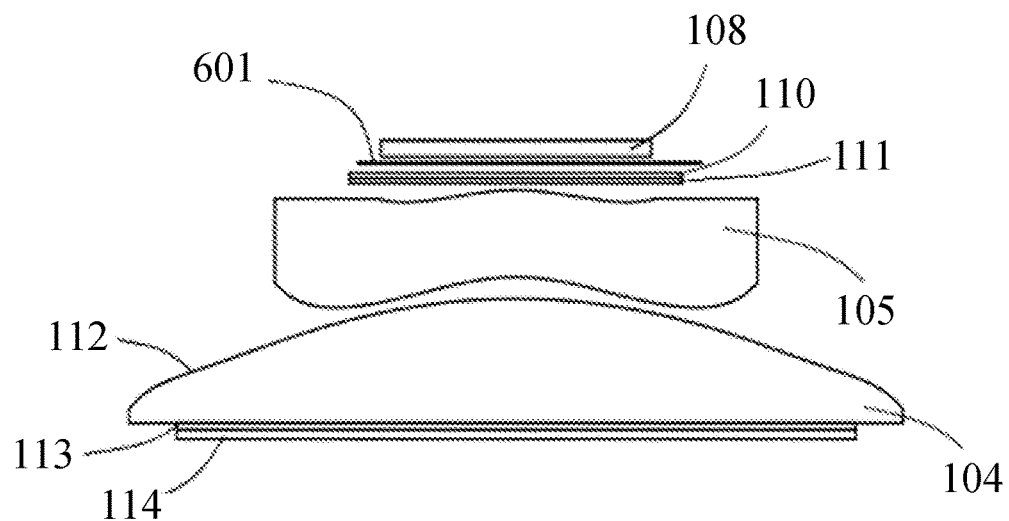
FIG. 23 explains a right-eye eyepiece optical system according to a sixth embodiment.

FIG. 23 explains a right-eye eyepiece optical system according to this embodiment. The right-eye eyepiece optical system according to this embodiment is different from the right-eye eyepiece optical system according to the first embodiment in that the right-eye eyepiece optical system according to this embodiment includes a dielectric multilayer film (minus filter) 601 as a correction element provided between the right-eye image display element 108 and the polarizing plate 110. In this embodiment, a description of a configuration similar to that of the first embodiment will be omitted. In this embodiment, the above color drift is reduced by the minus filter 601. A description will now be given of a method for reducing color drift using the dielectric multilayer film.

Figure 24:
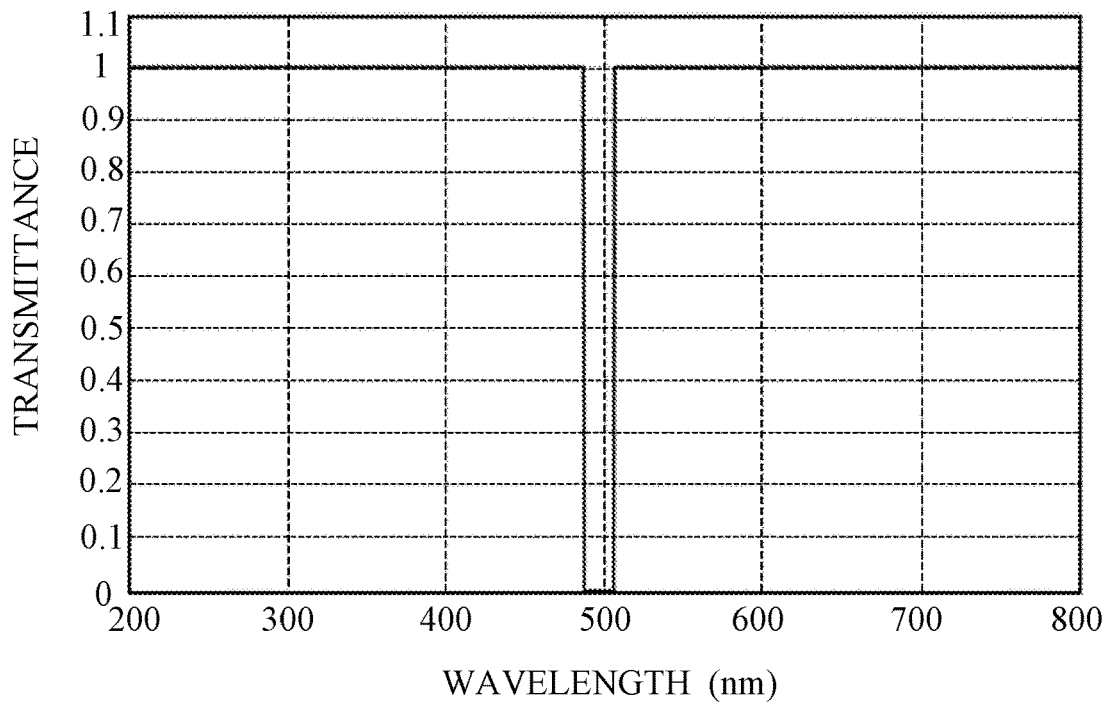
FIG. 24 explains a characteristic of a minus filter according to the sixth embodiment.
Figure 25:
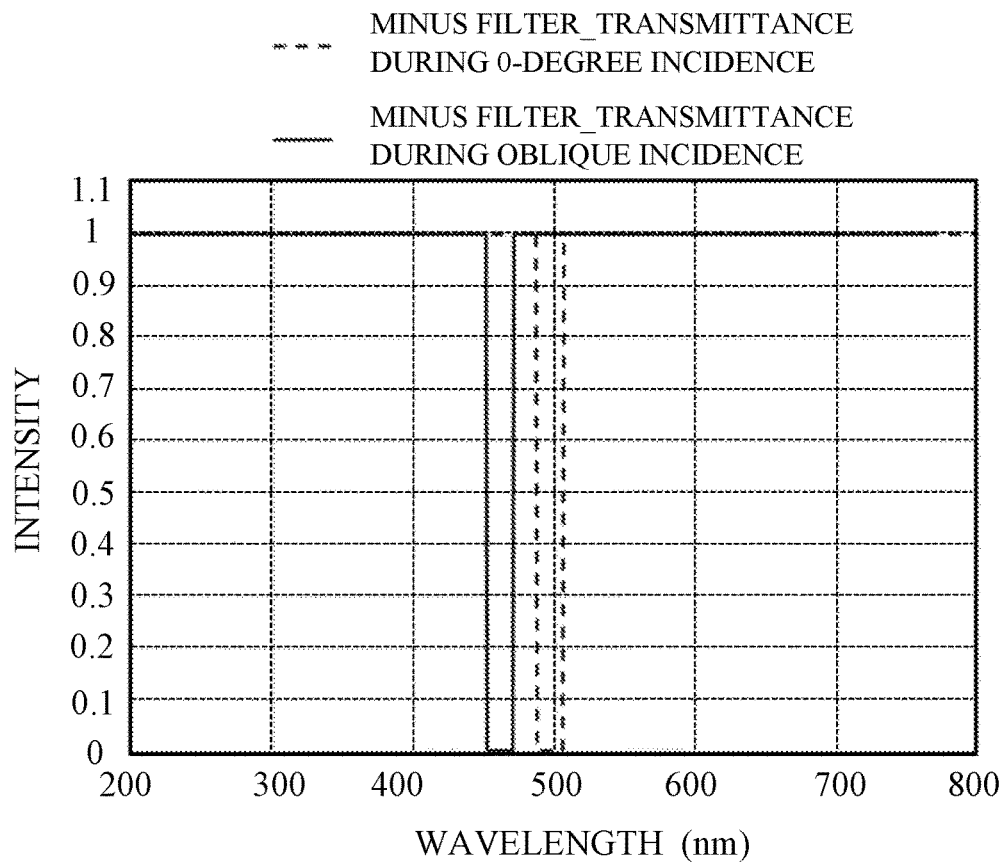
FIG. 25 explains the characteristic of the minus filter according to the sixth embodiment.

First, in general, a dielectric multilayer film is used as an optical filter that can reduce the transmittance in a specific wavelength range by alternately laminating a dielectric film having a high refractive index and a dielectric film having a low refractive index. In this specification, a wavelength range having transmittances lower than those of the surrounding wavelength range will be referred to as a stopband, and another high transmittance wavelength range will be referred to as a passband. The stopband has a relatively narrow width and a filter having such a characteristic that the transmittance is locally reduced as illustrated in FIG. 24 is known as a minus filter. The minus filter of FIG. 24 has a stopband in a low transmittance area near 500 nm, and a passband in the remaining high transmittance area. The structure, material, etc. of the multilayer film of the filter are properly designed according to a required characteristic. An optical filter using such a dielectric multilayer film is basically designed to acquire a desired transmission characteristic based on the interference effect and it is thus known as illustrated in FIG. 25 that the transmission characteristic of the optical filter shifts to a short wavelength side during oblique incidence in comparison with the transmission characteristic during 0-degree incidence. This embodiment forms the minus filter on the surface on the organic EL side in FIG. 23, and Table 1 below illustrates a layered structure. A substrate is made of BK7 glass, $Ta_2O_5$ is used for the high refractive index material, and $SiO_2$ is used for the low refractive index material, and they are laminated in 60 layers.

TABLE 1

| Number of Layers | Material | Film Thickness (nm) |
|---|---|---|
| 60 | $Ta_2O_5$ | 125.0 |
| 59 | $SiO_2$ | 182.8 |
| 58 | $Ta_2O_5$ | 126.6 |
| 57 | $SiO_2$ | 173.0 |
| 56 | $Ta_2O_5$ | 121.6 |
| 55 | $SiO_2$ | 167.1 |
| 54 | $Ta_2O_5$ | 123.8 |
| 53 | $SiO_2$ | 165.2 |
| 52 | $Ta_2O_5$ | 124.0 |
| 51 | $SiO_2$ | 163.5 |
| 50 | $Ta_2O_5$ | 125.7 |
| 49 | $SiO_2$ | 161.5 |
| 48 | $Ta_2O_5$ | 126.1 |
| 47 | $SiO_2$ | 161.5 |
| 46 | $Ta_2O_5$ | 127.3 |
| 45 | $SiO_2$ | 159.9 |
| 44 | $Ta_2O_5$ | 127.6 |
| 43 | $SiO_2$ | 160.2 |
| 42 | $Ta_2O_5$ | 128.0 |
| 41 | $SiO_2$ | 158.9 |
| 40 | $Ta_2O_5$ | 128.0 |
| 39 | $SiO_2$ | 159.5 |
| 38 | $Ta_2O_5$ | 128.3 |
| 37 | $SiO_2$ | 158.9 |
| 36 | $Ta_2O_5$ | 128.3 |
| 35 | $SiO_2$ | 159.2 |
| 34 | $Ta_2O_5$ | 128.5 |
| 33 | $SiO_2$ | 158.9 |
| 32 | $Ta_2O_5$ | 128.5 |
| 31 | $SiO_2$ | 159.2 |
| 30 | $Ta_2O_5$ | 128.5 |
| 29 | $SiO_2$ | 159.2 |
| 28 | $Ta_2O_5$ | 128.3 |
| 27 | $SiO_2$ | 159.5 |
| 26 | $Ta_2O_5$ | 128.0 |
| 25 | $SiO_2$ | 160.2 |
| 24 | $Ta_2O_5$ | 127.6 |
| 23 | $SiO_2$ | 160.5 |
| 22 | $Ta_2O_5$ | 127.1 |
| 21 | $SiO_2$ | 161.5 |
| 20 | $Ta_2O_5$ | 126.6 |
| 19 | $SiO_2$ | 162.2 |
| 18 | $Ta_2O_5$ | 125.9 |
| 17 | $SiO_2$ | 163.5 |
| 16 | $Ta_2O_5$ | 125.2 |
| 15 | $SiO_2$ | 164.5 |
| 14 | $Ta_2O_5$ | 124.0 |
| 13 | $SiO_2$ | 166.5 |
| 12 | $Ta_2O_5$ | 122.8 |
| 11 | $SiO_2$ | 168.5 |
| 10 | $Ta_2O_5$ | 121.2 |
| 9 | $SiO_2$ | 171.2 |
| 8 | $Ta_2O_5$ | 119.0 |
| 7 | $SiO_2$ | 173.8 |
| 6 | $Ta_2O_5$ | 119.5 |
| 5 | $SiO_2$ | 179.2 |
| 4 | $Ta_2O_5$ | 120.5 |
| 3 | $SiO_2$ | 180.3 |
| 2 | $Ta_2O_5$ | 118.8 |
| 1 | $SiO_2$ | 91.3 |
| Substrate | | |

Figure 26:
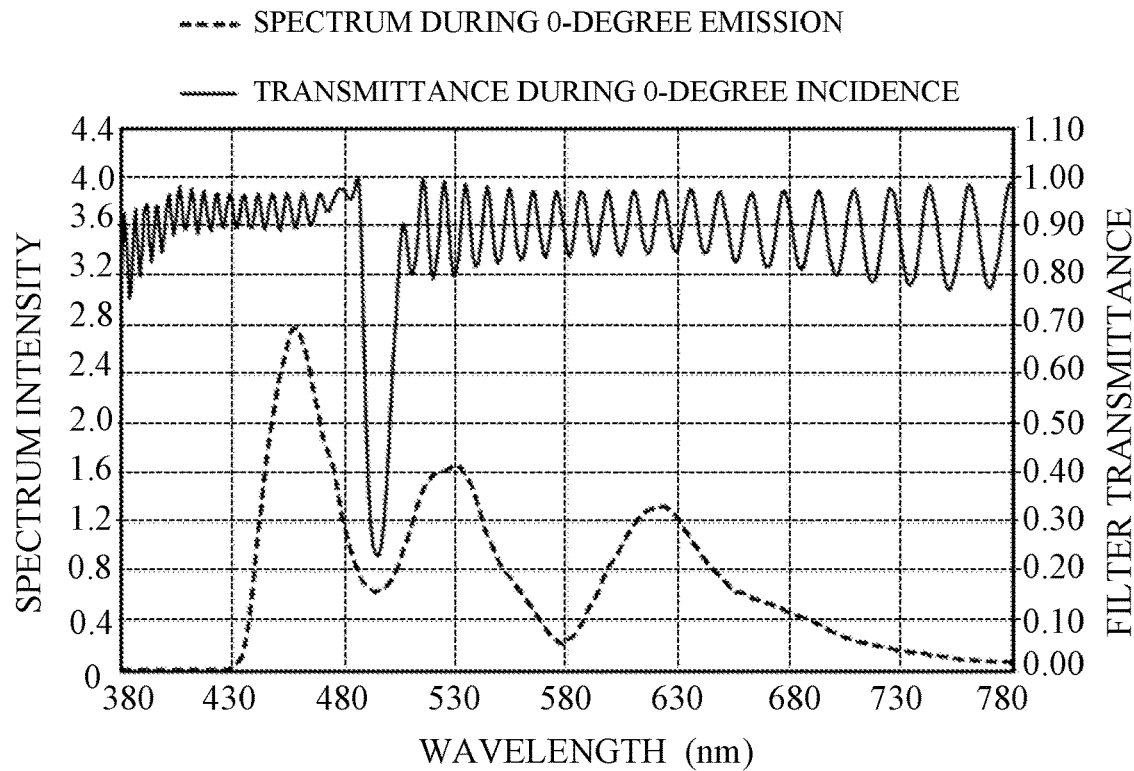
FIG. 26 explains an emission spectrum of an image display element according to the sixth embodiment.
Figure 27:
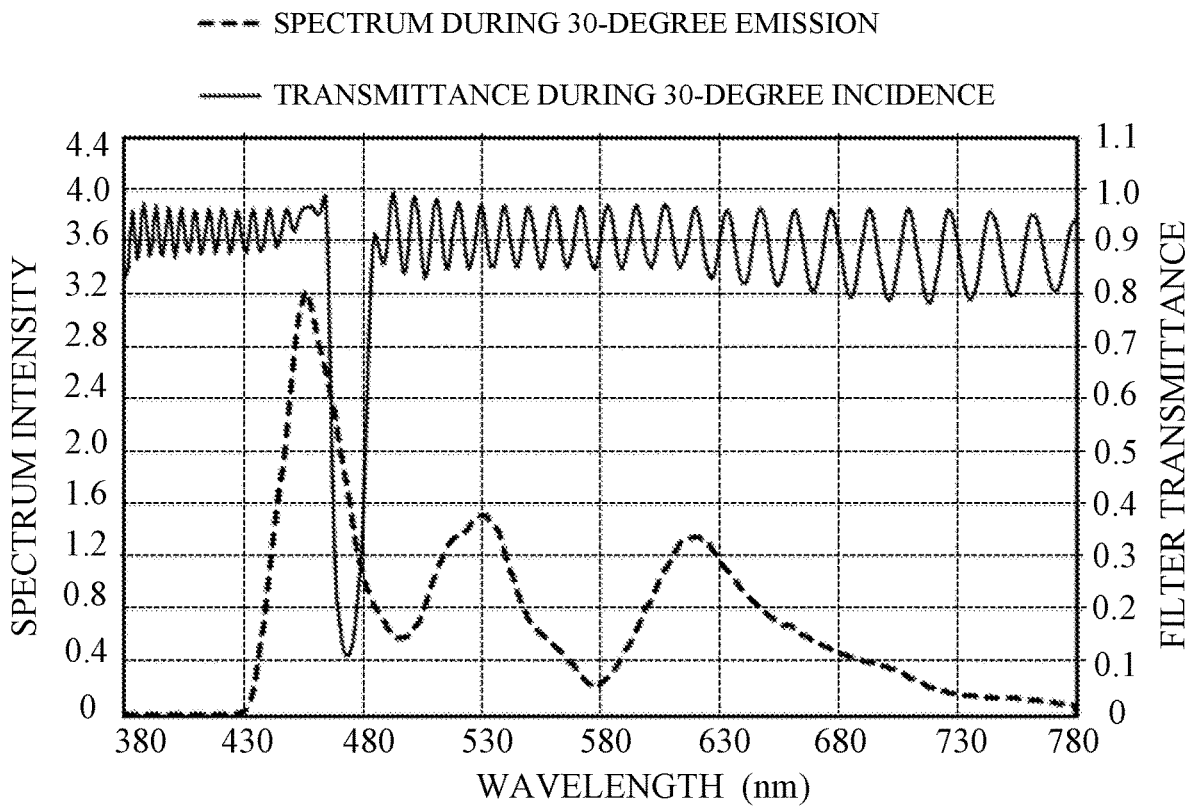
FIG. 27 explains the emission spectrum of the image display element according to the sixth embodiment.
Figure 28:
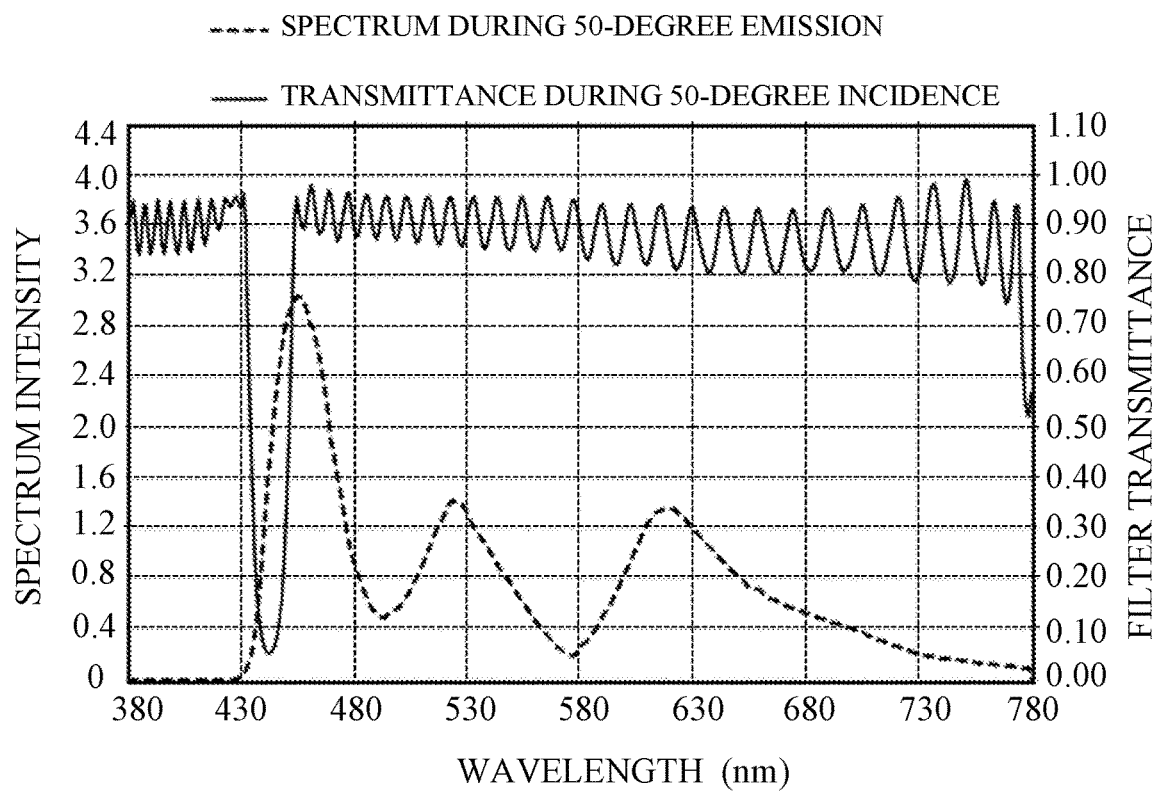
FIG. 28 explains the emission spectrum of the image display element according to the sixth embodiment.

FIG. 26 illustrates an emission spectrum distribution of the organic EL panel in a 0-degree emission direction and a transmittance distribution of the minus filter 601 in the 0-degree incident direction in this embodiment. FIG. 27 illustrates an emission spectrum distribution of the organic EL panel in a 30-degree emission direction and a transmittance distribution of the minus filter 601 in the 30-degree incident direction. FIG. 28 illustrates an emission spectrum distribution of the organic EL panel in the 50-degree emission direction and a transmittance distribution of the minus filter 601 in the 50-degree incident direction. First, a color difference $\Delta E^*ab$ of the light in the 30-degree emission direction from the 0-degree emission direction without the minus filter 601 is 15.6, an absolute value of a chromaticity difference $\Delta x$ is 0.0024, and an absolute value of a chromaticity difference $\Delta y$ is 0.0227. A color difference $\Delta E^*ab$ of the light in the 50-degree emission direction from the 0-degree emission direction without the minus filter 601 is 27.0, an absolute value of a chromaticity difference $\Delta x$ is 0.0009, and an absolute value of a chromaticity difference $\Delta y$ is 0.03608.

It is understood from the emission spectra of FIGS. 26, 27, and 28 that as the emission angle increases, the intensity of blue becomes higher and a color difference and a chromaticity difference become conspicuous. As illustrated in FIG. 26, the minus filter provided in this embodiment is designed to have a stopband near 500 nm during the 0-degree incidence. As illustrated in FIGS. 27 and 28, the minus filter functions to shift the stopband to a wavelength side where the stopband is short during the oblique incidence, and to gradually reduce the light transmittance in the blue wavelength range. As a result, when the light passes through the minus filter 601 in this embodiment, the color difference ΔE*ab of the light in the 30-degree emission direction from the 0-degree emission direction becomes 6.5, the absolute value of the chromaticity difference Δx becomes 0.007, and the absolute value of the chromaticity difference Δy becomes 0.004. The color difference ΔE*ab of the light in the 50-degree emission direction from the 0-degree emission direction becomes 10.2, the absolute value of the chromaticity difference Δx becomes 0.018, and the absolute value of the chromaticity difference Δy becomes 0.013.

Thus, the color drift characteristic, in which blue becomes stronger due to the oblique emission of the organic EL display, is reduced by shifting the stopband of the minus filter to the short wavelength side during oblique transmission. In a case where a blue component of the display tends to be stronger as in this embodiment, the stopband of the dielectric filter during the 0-degree incidence is designed to exist between the general blue wavelength band of 430 to 480 nm and the green wavelength band of 520 nm to 570 nm. Thereby, there is little color change during normal incidence and the blue component can be reduced during oblique incidence. Thus, if the stopband exists on a wavelength side longer than a color component to be reduced with respect to the emission angle, the color difference or chromaticity difference can be reduced by shifting the stopband in the visible light range during oblique incidence. This is similarly applied to the green component (520 to 570 nm) and the red component (600 to 650 nm). In correcting a plurality of color components, a filter having a plurality of stopbands is also applicable.

With the image display element alone according to this embodiment, the absolute value of the chromaticity difference x is 0.0009 and the absolute value of the chromaticity difference y is 0.03608 at an emission angle in the 50-degree direction. After the light passes through the eyepiece optical system, the absolute value of the chromaticity difference x increases up to 0.018, but the absolute value of the chromaticity difference y decreases down to 0.013. In order for the observer to observe a more natural image without noticing color drift, the absolute values of the chromaticity differences x and y may be 0.03 or less. In this embodiment, it is understood that the chromaticity difference is corrected to a level that enables the observer to observe a more natural image.

The color difference ΔE*ab can be reduced from 27.0 to 10.2. In order for the observer to observe a more natural image without noticing color drift, the color difference ΔE*ab on the chromaticity coordinate system may be 15 or less. In this embodiment, it is understood that the color difference is corrected to a level that enables the observer to observe a more natural image.

In this embodiment, the filter is disposed as a separate component, but may be provided on the surface of the cover glass of the organic EL panel for space saving and the reduced number of components. The filter may also be formed on the surface of any optical element. In these cases, a necessary multilayer film configuration may be properly designed according to the refractive index of the base material and the like. The configuration of the dielectric multilayer film can be properly designed according to the emission spectrum of the organic EL panel, the display optical system, the color drift characteristic at the emission angle in the oblique direction, and the like.

In the above description, the image observation apparatus according to this embodiment includes a dielectric multilayer film on one surface between the light emitting portion of the image display element and the exit pupil. Due to the incident angle characteristic of the dielectric multilayer film, a color difference or chromaticity difference of the light emitted from the peripheral portion of the image display element to the exit pupil from the light emitted from the central portion of the image display element to the exit pupil becomes smaller when the light passes through the dielectric multilayer film.

Seventh Embodiment

Figure 29:
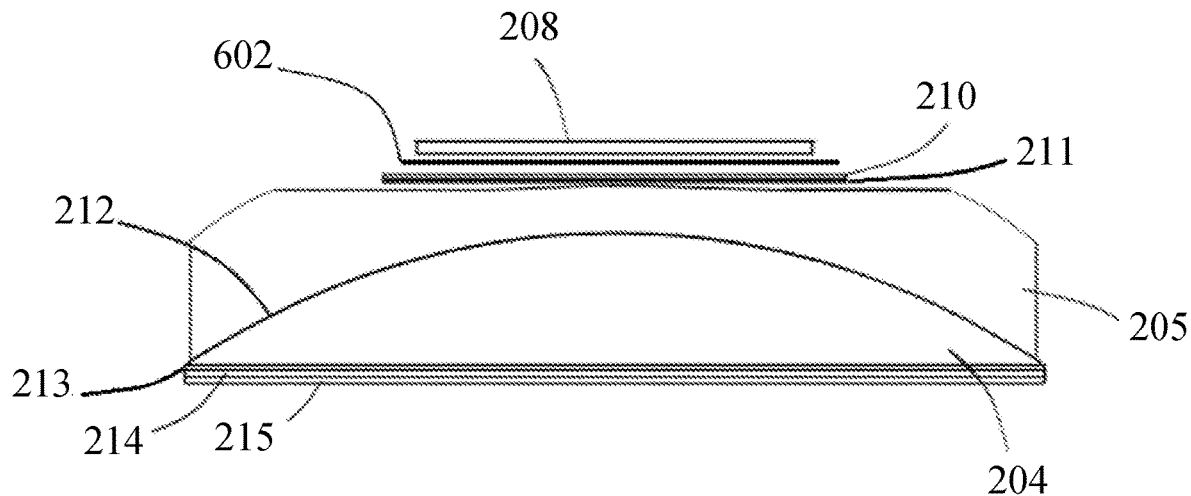
FIG. 29 explains a right-eye eyepiece optical system according to a seventh embodiment.

FIG. 29 explains a right-eye eyepiece optical system according to this embodiment. The right-eye eyepiece optical system according to this embodiment is different from the right-eye eyepiece optical system according to the second embodiment in that the right-eye eyepiece optical system according to this embodiment includes a dielectric multilayer film (IR cut filter) 602 as a correction element provided between the right-eye image display element 208 and the polarizing plate 210. In this embodiment, a description of a configuration similar to that of the second embodiment will be omitted. In this embodiment, the IR cut filter 602 reduces the above color drift. A description will now be given of a method for reducing color drift using this dielectric multilayer film.

Figure 30:
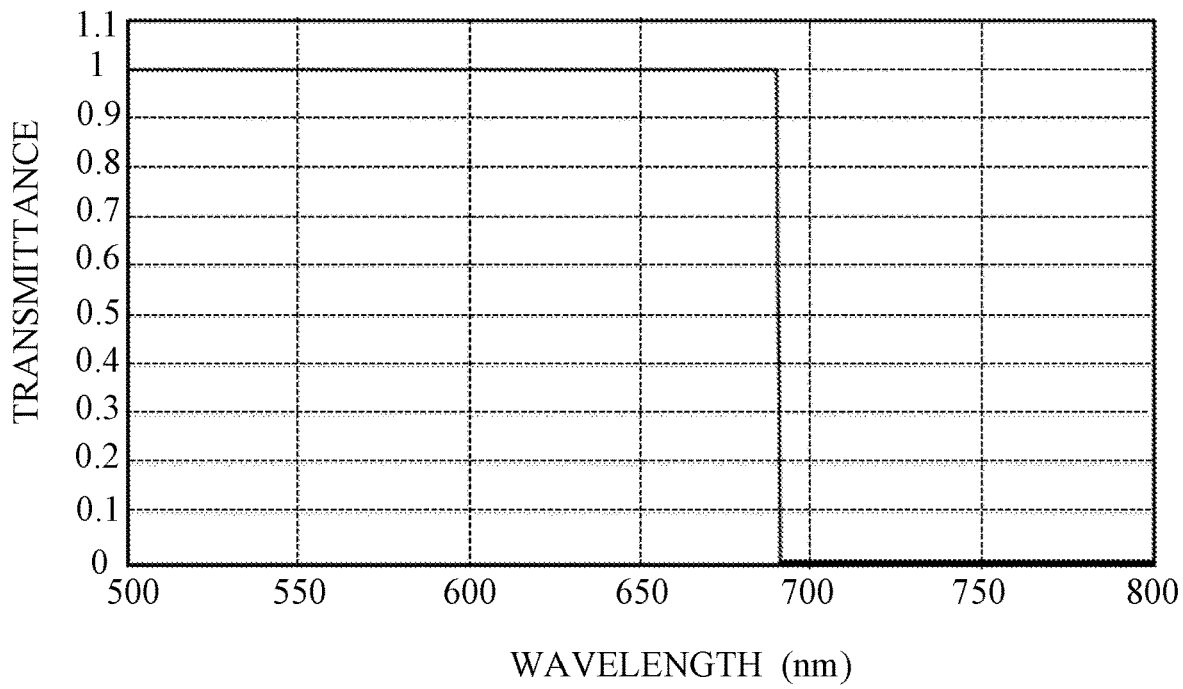
FIG. 30 explains a characteristic of an infrared (IR) (cut) filter according to the seventh embodiment.
Figure 31:
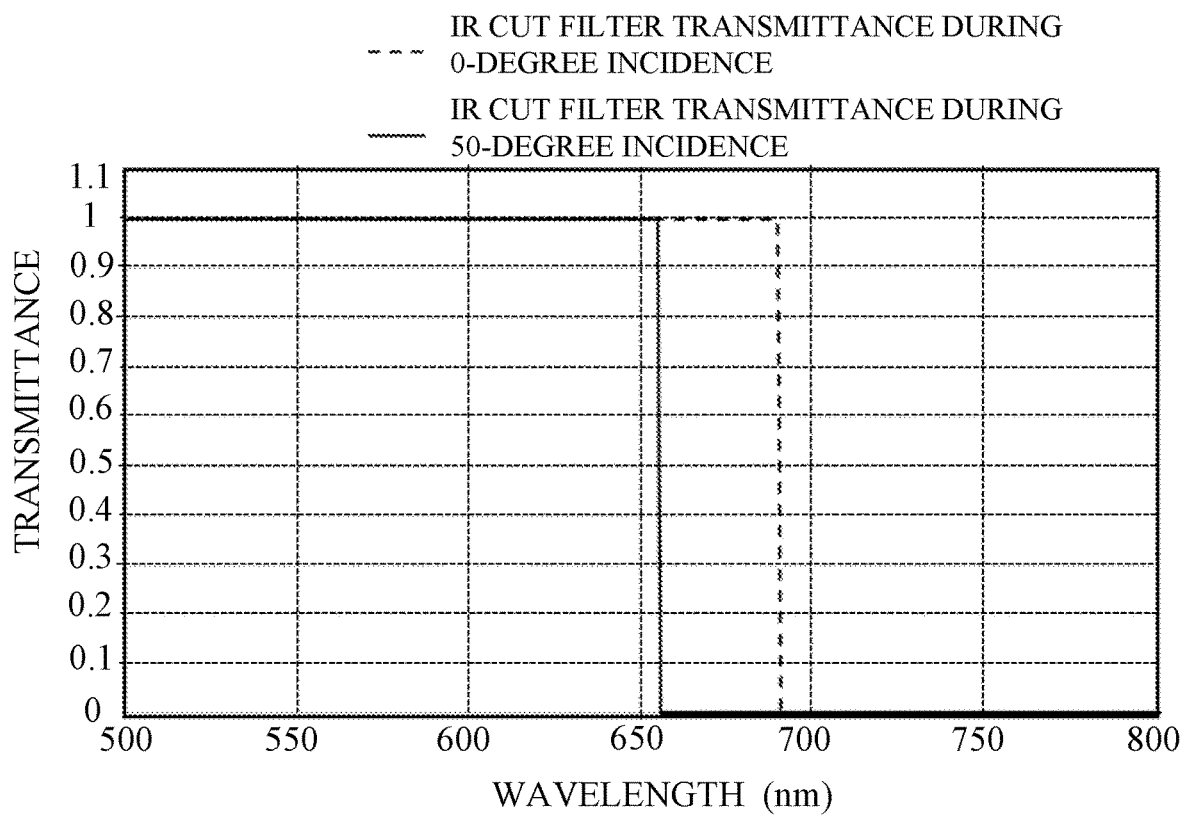
FIG. 31 explains the characteristic of the IR cut filter according to the seventh embodiment.

As illustrated in FIG. 30, the dielectric multilayer film filter having such a characteristic that the transmittance decreases in an infrared area is known as an IR cut filter. The IR cut filter of FIG. 30 has a passband in the high transmittance range of less than 690 nm, and a stopband in the low transmittance range on a longer wavelength side of it. The structure, material, etc. of the multilayer film of the filter are properly designed according to a required characteristic. An optical filter using the dielectric multilayer film is basically designed to acquire a desired transmission characteristic based on the interference effect and it is known that the transmission characteristic shift to a short wavelength side during oblique incidence in comparison with the transmission characteristic during 0-degree incidence, as illustrated in FIG. 31. In this embodiment, an IR cut filter is formed on the surface on the organic EL (the right-eye image display element 208) side of the polarizing plate 210 in FIG. 29, and Table 2 below illustrates a layered structure. A substrate is made of BK7 glass, TiO$_2$ is used for the high refractive index material, and SiO$_2$ is used for the low refractive index material, and thy are laminated in 35 layers.

TABLE 2

| Number of Layers | Material | Film Thickness (nm) |
|---|---|---|
| 35 | SiO$_2$ | 78.4 |
| 34 | TiO$_2$ | 86.2 |
| 33 | SiO$_2$ | 160.2 |
| 32 | TiO$_2$ | 82.9 |
| 31 | SiO$_2$ | 155.7 |
| 30 | TiO$_2$ | 81.8 |
| 29 | SiO$_2$ | 154.6 |

TABLE 2-continued

| Number of Layers | Material | Film Thickness (nm) |
|---|---|---|
| 28 | $TiO_2$ | 80.6 |
| 27 | $SiO_2$ | 153.4 |
| 26 | $TiO_2$ | 80.6 |
| 25 | $SiO_2$ | 153.4 |
| 24 | $TiO_2$ | 80.6 |
| 23 | $SiO_2$ | 154.6 |
| 22 | $TiO_2$ | 82.9 |
| 21 | $SiO_2$ | 159.0 |
| 20 | $TiO_2$ | 88.5 |
| 19 | $SiO_2$ | 174.7 |
| 18 | $TiO_2$ | 109.8 |
| 17 | $SiO_2$ | 192.6 |
| 16 | $TiO_2$ | 103.0 |
| 15 | $SiO_2$ | 171.4 |
| 14 | $TiO_2$ | 103.0 |
| 13 | $SiO_2$ | 194.9 |
| 12 | $TiO_2$ | 116.5 |
| 11 | $SiO_2$ | 201.6 |
| 10 | $TiO_2$ | 117.6 |
| 9 | $SiO_2$ | 202.7 |
| 8 | $TiO_2$ | 116.5 |
| 7 | $SiO_2$ | 201.6 |
| 6 | $TiO_2$ | 115.4 |
| 5 | $SiO_2$ | 192.6 |
| 4 | $TiO_2$ | 110.9 |
| 3 | $SiO_2$ | 37.0 |
| 2 | $TiO_2$ | 9.0 |
| 1 | $SiO_2$ | 150.1 |
|   | Substrate |  |

Figure 32:
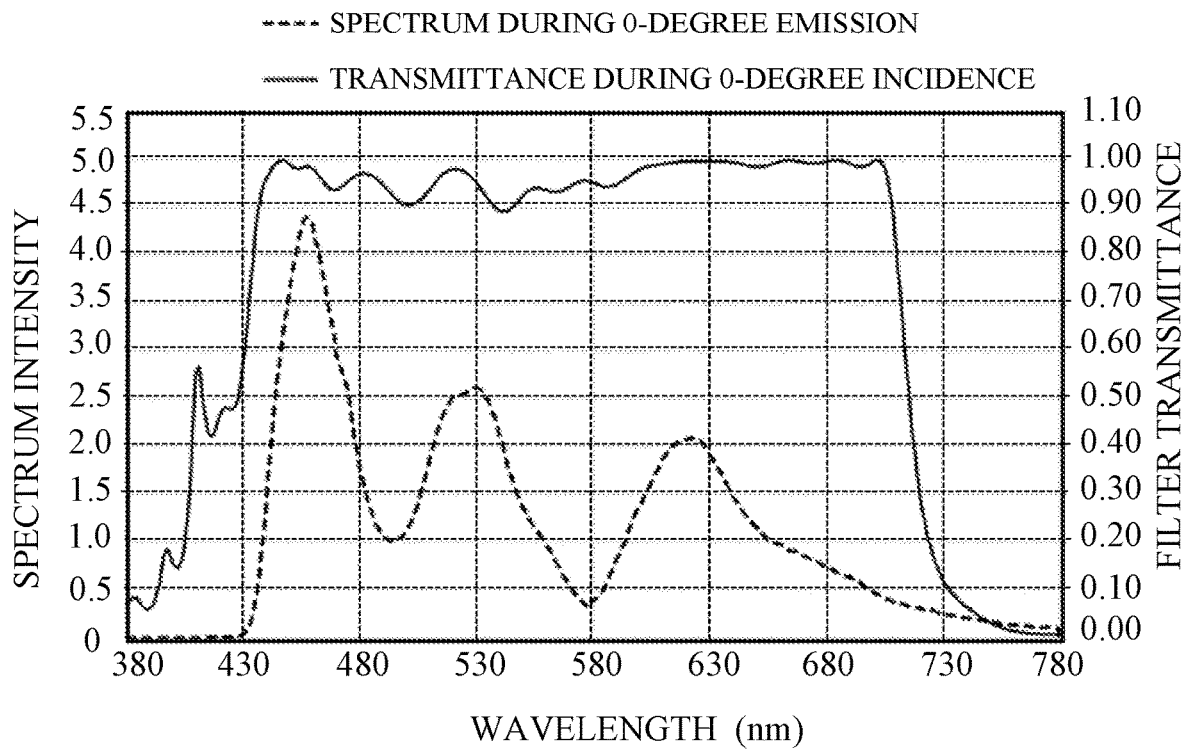
FIG. 32 explains an emission spectrum of an image display element according to the seventh embodiment.
Figure 33:
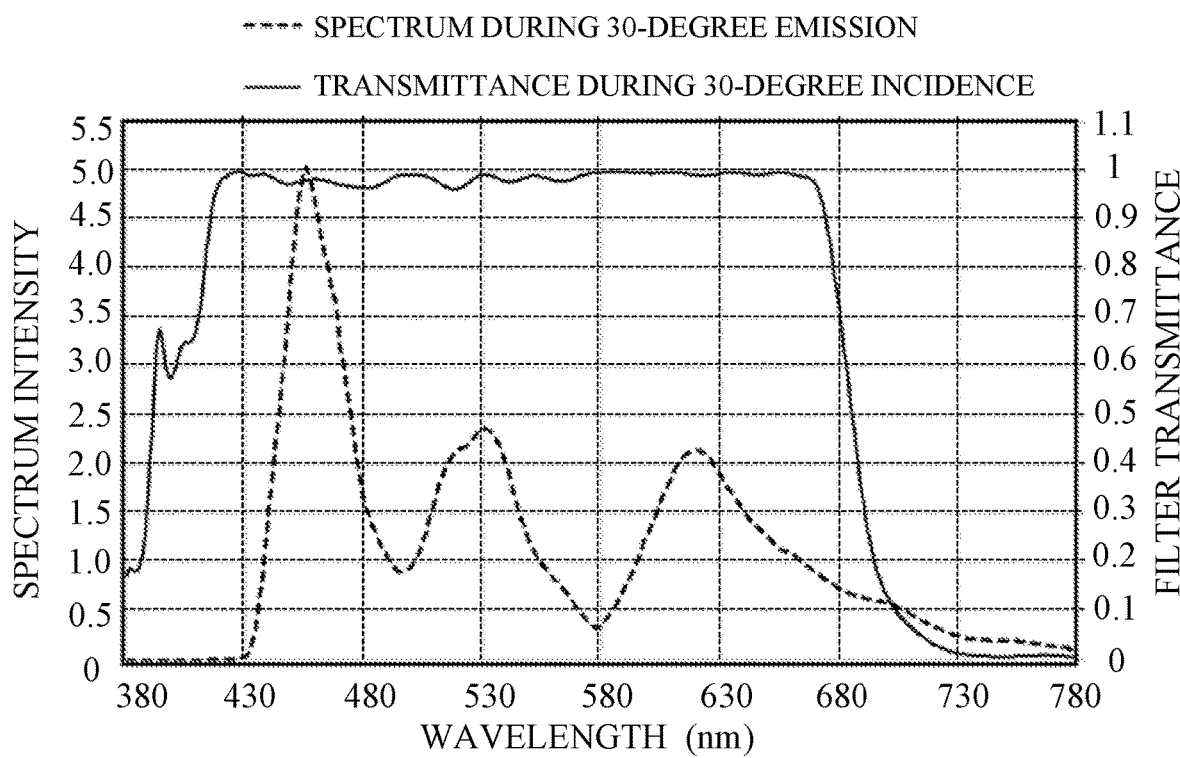
FIG. 33 explains the emission spectrum of the image display element according to the seventh embodiment.
Figure 34:
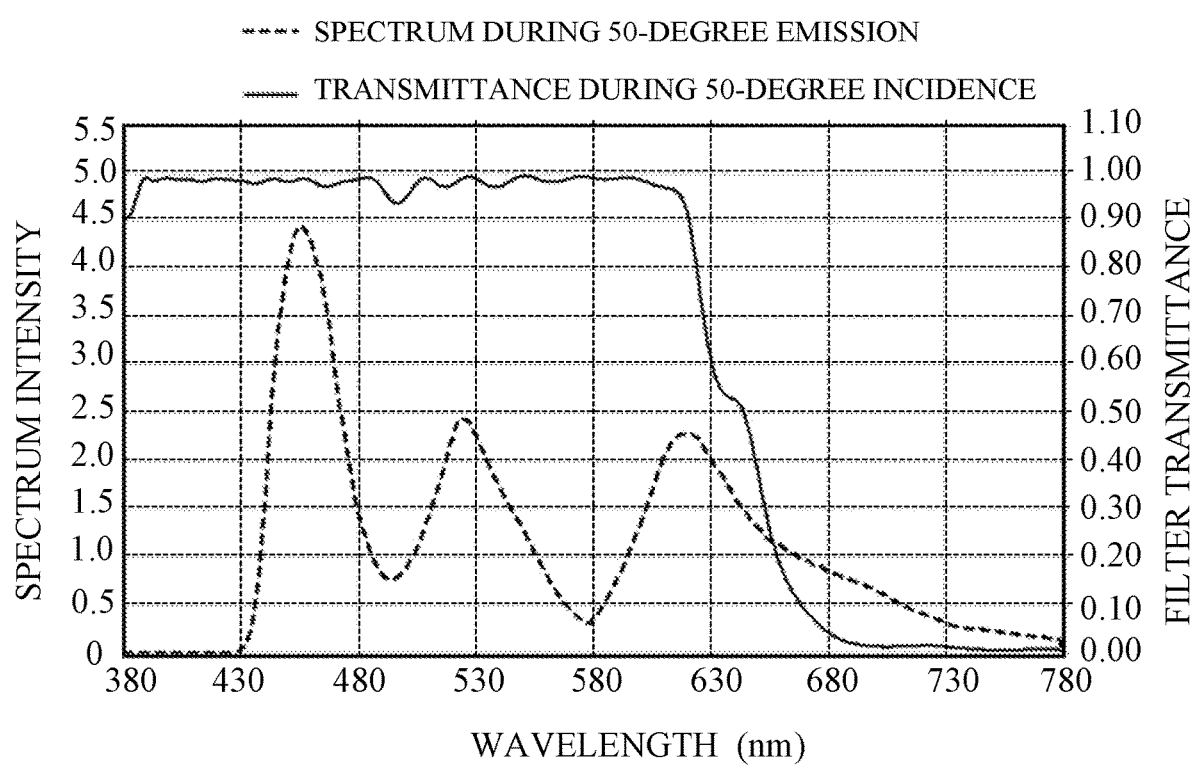
FIG. 34 explains the emission spectrum of the image display element according to the seventh embodiment.

FIG. 32 illustrates an emission spectrum distribution of the organic EL panel in a 0-degree emission direction and a transmittance distribution of the IR cut filter in the 0-degree incident direction in this embodiment. FIG. 33 illustrates an emission spectrum distribution of the organic EL panel in a 30-degree emission direction and a transmittance distribution of the IR cut filter in the 30-degree incident direction. FIG. 34 illustrates an emission spectrum distribution of the organic EL panel in the 50-degree emission direction and a transmittance distribution of the IR cut filter in the 50-degree incident direction. First, a color difference $\Delta E^*ab$ of the light in the 30-degree emission direction from the 0-degree emission direction without the IR cut filter is 17.4, an absolute value of a chromaticity difference $\Delta x$ is 0.0015, and an absolute value of a chromaticity difference $\Delta y$ is 0.0212. A color difference $\Delta E^*ab$ of the light in the 50-degree emission direction from the 0-degree emission direction is 21.7, an absolute value of a chromaticity difference $\Delta x$ is 0.0083, and an absolute value of a chromaticity difference $\Delta y$ is 0.0208.

It is understood from the emission spectra and chromaticity differences in FIGS. 32, 33, and 34 that as the emission angle increases, the intensity of red becomes higher and a color difference becomes conspicuous. As illustrated in FIG. 32, the IR cut filter provided in this embodiment is designed to have a stopband in a wavelength range of 730 nm or higher, which is an infrared wavelength range, during the 0-degree incidence. As illustrated in FIGS. 33 and 34, the IR cut filter functions to shift the stopband to a wavelength side where the stopband is short during the oblique incidence, and to gradually reduce the light transmittance in the red wavelength range. As a result, when the light passes through the IR cut filter 602 in this embodiment, the color difference $\Delta E^*ab$ of the light in the 30-degree emission direction from the 0-degree emission direction becomes 13.1, the chromaticity difference $\Delta x$ becomes 0.0023, and the chromaticity difference $\Delta y$ becomes 0.0166. The color difference $\Delta E^*ab$ of the light in the 50-degree emission direction from the 0-degree emission direction becomes 11.4, the chromaticity difference $\Delta x$ becomes 0.0108, and the chromaticity difference $\Delta y$ becomes 0.0173. Thus, the color drift characteristic, in which the red becomes stronger due to the oblique emission of the organic EL display, is reduced by shifting the stopband of the IR cut filter to the short wavelength side during oblique transmission.

In a case where a red component of the display tends to be strong as in this embodiment, the stopband of the dielectric filter during the 0-degree incidence is designed to exist at 640 nm or higher, which is a general red wavelength. Thereby, there is little color change during normal incidence and the red component can be reduced during oblique incidence. Thus, if a dielectric multilayer filter is used as in the first embodiment, in which the stopband exists on a wavelength side longer than a color component to be reduced with respect to the emission angle, the color difference or chromaticity difference can be reduced by shifting the stopband in the visible light range during oblique incidence.

In reducing the red component as in this embodiment, it is unnecessary to use a filter having a local stopband like a minus filter, and the embodiment can use the IR cut filter having a stopband in a wide range over the invisible range on a long wavelength side.

With the image display element alone according to this embodiment, the absolute value of the chromaticity difference x is 0.0083 and the absolute value of the chromaticity difference y is 0.0208 at an emission angle in the 50-degree direction. After the light passes through the eyepiece optical system, the absolute value of the chromaticity difference x increases up to 0.0108, but the absolute value of the chromaticity difference y decreases down to 0.0173. In order for the observer to observe a more natural image without noticing color drift, the absolute values of the chromaticity differences x and y on the chromaticity coordinate system may be 0.03 or less or 0.018 or less. In this embodiment, it is understood that the chromaticity difference is corrected to a level that enables the observer to observe a more natural image.

The color difference $\Delta E^*ab$ can be reduced from 21.7 to 11.4. In order for the observer to observe a more natural image without noticing color drift, the color difference $\Delta E^*ab$ on the chromaticity coordinate system may be 15 or less. In this embodiment, it is understood that the color difference is corrected to a level that enables the observer to observe a more natural image.

In this embodiment, the filter is disposed as a separate component, but may be provided on the surface of the cover glass of the organic EL panel for space saving and the reduced number of components. The filter may also be formed on the surface of any other optical element. In these cases, a necessary multilayer film configuration may be properly designed according to the refractive index of the base material and the like. The configuration of the dielectric multilayer film can be properly designed according to the emission spectrum of the organic EL panel, the display optical system, the color drift characteristic at the emission angle in the oblique direction, and the like.

Each embodiment can provide an image display apparatus that is advantageous in reducing color drift of a peripheral portion of an image display element from a central portion of the image display element.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-187505, filed on Nov. 18, 2021, and No. 2022-028542, filed on Feb. 25, 2022, each of which is hereby incorporated by reference herein in its entirety.

What is claimed is:

1. An image display apparatus comprising:
an image display element; and
an eyepiece optical system configured to guide light from the image display element to an exit pupil,
wherein the eyepiece optical system includes at least one correction element,
wherein, in the at least one correction element, spectral transmittance to first light emitted from a central portion of the image display element is different from spectral transmittance to second light emitted from an outermost peripheral portion of the image display element, and
wherein the spectral transmittance to the first light and the spectral transmittance to the second light are set such that color drift of the second light after passing through the peripheral area from the first light after passing through the central area is less than color drift of the second light before passing through the peripheral area from the first light before passing through the central area.

2. The image display apparatus according to claim 1, wherein the at least one correction element includes a phase plate.

3. The image display apparatus according to claim 1, wherein the at least one correction element includes a polarizing beam splitter.

4. The image display apparatus according to claim 1, wherein the at least one correction element includes a polarizing plate.

5. The image display apparatus according to claim 1, wherein the at least one correction element includes a phase plate, a polarizing beam splitter, and a polarizing plate, and wherein of a first wavelength included in a range from 430 nm to 480 nm, a second wavelength included in a range from 520 nm to 570 nm, and a third wavelength included in a range from 600 nm to 650 nm, a wavelength at which a value of a ratio of an intensity of the second light to an intensity of the first light becomes maximum and a wavelength at which at least one of a transmittance of the polarizing plate, a transmittance of the phase plate, a reflectance of the polarizing beam splitter, and a transmittance of the polarizing beam splitter becomes minimum in an optical path from the outermost peripheral portion to the exit pupil are equal to each other.

6. The image display apparatus according to claim 1, wherein the at least one correction element includes a half-transmissive reflective film.

7. The image display apparatus according to claim 1, wherein the at least one correction element includes an antireflection film.

8. The image display apparatus according to claim 7, wherein of a first wavelength included in a range from 430 nm to 480 nm, a second wavelength included in a range from 520 nm to 570 nm, and a third wavelength included in a range from 600 nm to 650 nm, a wavelength at which a value of a ratio of an intensity of the second light to an intensity of the first light becomes maximum and a wavelength at which a transmittance of the antireflection film becomes minimum in an optical path from the outermost peripheral portion to the exit pupil are equal to each other.

9. The image display apparatus according to claim 1, wherein the at least one correction element includes a dielectric multilayer film.

10. The image display apparatus according to claim 9, wherein the dielectric multilayer film is provided on the image display element, and
wherein where a first wavelength is a wavelength in a range from 430 nm to 480 nm, a second wavelength is a wavelength in a range from 520 nm to 570 nm, and a third wavelength is a wavelength in a range from 600 nm to 650 nm, a stopband of the dielectric multilayer film exists in each of a band between the first wavelength and the second wavelength, a band between the second wavelength and the third wavelength, and a band with wavelengths longer than the third wavelength.

11. The image display apparatus according to claim 1, wherein the eyepiece optical system includes, in order from a side of the image display element, a first polarizing plate, a first phase plate, a lens, a second phase plate, and a polarizing beam splitter,
wherein an emission angle of the second light is larger than half a display view angle of the eyepiece optical system, and
wherein at least one of the first polarizing plate and the first phase plate functions as the correction element.

12. The image display apparatus according to claim 1, wherein the eyepiece optical system includes, in order from a side of the image display element, a first polarizing plate, a first phase plate, a lens, a second phase plate, a polarizing beam splitter, and a second polarizing plate,
wherein an emission angle of the second light is larger than half a display view angle of the eyepiece optical system, and
wherein at least one of the second phase plate, the polarizing beam splitter, and the second polarizing plate functions as the correction element.

13. The image display apparatus according to claim 1, wherein after the first light and the second light pass through the eyepiece optical system, a color difference $\Delta E^*$ of the second light from the first light is 15 or less, and
wherein after the first light and the second light pass through the eyepiece optical system, a chromaticity difference x of the second light from the first light is 0.05 or less, and a chromaticity difference y of the second light from the first light is 0.05 or less on a chromaticity diagram.

14. The image display apparatus according to claim 1, wherein an emission angle of the second light is 30 degrees or more.

15. The image display apparatus according to claim 1, wherein a wavelength at which a value of a ratio of an intensity of the second light to an intensity of the first light becomes maximum is included in a range from 430 nm to 480 nm.

16. The image display apparatus according to claim 1, wherein of a first wavelength included in a range from 430 nm to 480 nm, a second wavelength included in a range from 520 nm to 570 nm, and a third wavelength included in a range from 600 nm to 650 nm, a wavelength at which a value of a ratio of an intensity of the second light to an intensity of the first light becomes maximum is equal irrespective of an emission direction of the light emitted from the image display element.

17. The image display apparatus according to claim 1, wherein after the first light and the second light pass through the eyepiece optical system, color drift of the second light from the first light in a horizontal direction is less than color drift of the second light from the first light in a vertical direction.

18. The image display apparatus according to claim 1, wherein a white balance is different between the central portion of the image display element and an area different from the central portion of the image display element.

19. The image display apparatus according to claim 18, wherein of a first wavelength included in a range from 430 nm to 480 nm, a second wavelength included in a range from 520 nm to 570 nm, and a third wavelength included in a range from 600 nm to 650 nm, a wavelength at which a value of a ratio of an intensity of the second light to an intensity of the first light becomes maximum and a wavelength at which a gain of the central portion of the image display element to a gain of the outermost peripheral portion of the image display element becomes minimum are equal to each other.

20. An image display apparatus comprising:
an image display element; and
an eyepiece optical system configured to guide light from the image display element to an exit pupil,
wherein, when light emitted from a central portion of the image display element and passing through the eyepiece optical system is referred to as first transmitted light, and light emitted from an outermost peripheral portion of the image display element and passing through the eyepiece system is referred to as second transmitted light, a white balance is different between the central portion and the outermost peripheral portion such that color drift of the second transmitted light from the first transmitted light is less than color drift of the second light from the first light in the case where the white balance is the same between the central portion and the outermost peripheral portion.

* * * * *